United States Patent
Park et al.

(10) Patent No.: US 8,488,684 B2
(45) Date of Patent: Jul. 16, 2013

(54) METHODS AND SYSTEMS FOR HYBRID MIMO DECODING

(75) Inventors: Jong Hyeon Park, San Jose, CA (US); Youngjae Kim, Cupertino, CA (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 718 days.

(21) Appl. No.: 12/211,890

(22) Filed: Sep. 17, 2008

(65) Prior Publication Data
US 2010/0067596 A1     Mar. 18, 2010

(51) Int. Cl.
*H04B 14/06* (2006.01)
*H04K 1/10* (2006.01)
*H04W 4/00* (2009.01)

(52) U.S. Cl.
USPC ............... 375/245; 375/260; 370/329

(58) Field of Classification Search
USPC ..................... 375/245, 260; 370/329
See application file for complete search history.

(56) References Cited

U.S. PATENT DOCUMENTS

| | | | | | |
|---|---|---|---|---|---|
| 4,573,167 | A | * | 2/1986 | Hentschke et al. | 375/245 |
| 4,689,671 | A | * | 8/1987 | Ohki et al. | 375/240.13 |
| 4,815,068 | A | * | 3/1989 | Dolby et al. | 369/88 |
| 6,691,082 | B1 | * | 2/2004 | Aguilar et al. | 704/219 |
| 2001/0023396 | A1 | * | 9/2001 | Gersho et al. | 704/220 |
| 2002/0071487 | A1 | * | 6/2002 | Kutka | 375/240.03 |
| 2002/0085630 | A1 | * | 7/2002 | Kleihorst et al. | 375/240 |
| 2002/0110197 | A1 | * | 8/2002 | Pearlstein et al. | 375/240.27 |
| 2003/0039226 | A1 | * | 2/2003 | Kwak | 370/329 |
| 2004/0047438 | A1 | * | 3/2004 | Zhuang et al. | 375/340 |
| 2004/0168110 | A1 | * | 8/2004 | Fuldseth et al. | 714/48 |
| 2004/0252791 | A1 | * | 12/2004 | Shen et al. | 375/340 |
| 2006/0274836 | A1 | | 12/2006 | Sampath et al. | |
| 2007/0280387 | A1 | * | 12/2007 | Li et al. | 375/347 |
| 2008/0198941 | A1 | | 8/2008 | Song et al. | |
| 2009/0113429 | A1 | * | 4/2009 | Luschi et al. | 718/100 |
| 2009/0304116 | A1 | * | 12/2009 | Challa et al. | 375/340 |

FOREIGN PATENT DOCUMENTS

| | | |
|---|---|---|
| TW | 200707998 | 2/2007 |
| WO | WO2006138135 A2 | 12/2006 |
| WO | WO2008021286 | 2/2008 |

OTHER PUBLICATIONS

Taiwan Search Report—TW098131407—TIPO—Nov. 1, 2012.
Written Opinion—PCT/US2009/057057, International Search Authority, European Patent Office, Jan. 2, 2010.
International Search Report—PCT/US2009/057057—International Search Authority, European Patent Office, Jan. 2, 2010.
Peng Yu, et al., "Combined nulling-canceling and maximum-likelihood detection for multiple antenna communication", XP031279622 ISBN: 978-1-4244-2029-2.

* cited by examiner

*Primary Examiner* — Leon-Viet Nguyen
*Assistant Examiner* — Sarah Hassan
(74) *Attorney, Agent, or Firm* — Tyler J. Overall

(57) ABSTRACT

Certain embodiments of the present disclosure allow a receiver to utilize both a minimum mean square error (MMSE) detection algorithm and a maximum likelihood (ML) detection algorithm. The receiver may control, based on various conditions, a mode selection signal to select between output generated with the MMSE detection algorithm and the ML detection algorithm. By sharing logical components, certain embodiments may allow a receiver to implement both ML and MMSE detection algorithms with minimal computational overhead when compared to implementing a single one of the decoding algorithms.

20 Claims, 17 Drawing Sheets

METHODS AND SYSTEMS FOR HYBRID MIMO DECODING

TECHNICAL FIELD

The present invention relates generally to MIMO OFDM communication systems and more specifically to a method for unified hybrid receiver that supports both maximum-likelihood (ML) and minimum mean square error (MMSE) detection, with only small overhead in computational complexity for MMSE solution.

BACKGROUND

A multiple-input multiple-output (MIMO) communication system employs multiple ($N_t$) transmit antennas and multiple ($N_r$) receive antennas for data transmission. A MIMO channel formed by the $N_t$ transmit and $N_r$ receive antennas may be decomposed into $N_S$ independent channels, with $N_S \leq \min\{N_t, N_r\}$. Each of the $N_S$ independent channels is also referred to as a spatial subchannel of the MIMO channel and corresponds to a dimension. The MIMO system can provide improved performance (e.g., increased transmission capacity) over that of a single-input single-output (SISO) communication system if the additional dimensionalities created by the multiple transmit and receive antennas are utilized.

A wideband MIMO system typically experiences frequency selective fading, meaning different amounts of attenuation across the system bandwidth. This frequency selective fading causes inter-symbol interference (ISI), which is a phenomenon whereby each symbol in a received signal acts as distortion to subsequent symbols in the received signal. This distortion degrades performance by impacting the ability to correctly detect the received symbols. As such, ISI is a non-negligible noise component that may have a large impact on the overall signal-to-noise-and-interference ratio (SNR) for systems designed to operate at high SNR levels, such as MIMO systems. In such systems, channel equalization may be used at the receivers to combat ISI. However, the computational complexity required to perform equalization is typically significant or prohibitive for most applications.

Orthogonal frequency division multiplexing (OFDM) may be used to combat ISI without the use of computationally intensive equalization. An OFDM system effectively partitions the system bandwidth into a number of ($N_F$) frequency subchannels, which may be referred to as sub-bands or frequency bins. Each frequency subchannel is associated with a respective subcarrier frequency upon which data may be modulated. The frequency subchannels of the OFDM system may experience frequency selective fading (i.e., different amounts of attenuation for different frequency subchannels) depending on the characteristics (e.g., multipath profile) of the propagation path between transmit and receive antennas. With OFDM, the ISI due to the frequency selective fading may be combated by repeating a portion of each OFDM symbol (i.e., appending a cyclic prefix to each OFDM symbol), as is known in the art. A MIMO system may thus advantageously employ OFDM to combat ISI.

In order to increase the transmission data rate and spectral efficiency of the system, spatial multiplexing can be utilized at the transmitter where different and independent data streams are sent over a plurality of spatial subchannels. The detection accuracy at the receiver can be severely degraded due to a strong multiple access interference (interference of different data streams transmitted from a plurality of antennas). Furthermore, spatial and frequency subchannels of the MIMO-OFDM system may experience different channel conditions (e.g., different fading and multipath effects) and may achieve different SNRs. Moreover, the channel conditions may vary over time.

In order to successfully mitigate the multiple access interference, effects of noise and fading, the minimum mean square error (MMSE) channel equalization is typically applied at the receiver. However, an estimated signal obtained from the MMSE algorithm contains a bias which represents a self noise that degrades detection accuracy. It is well known in the art that MMSE technique can be simplified if a direct inversion of the channel matrix is replaced by the QR decomposition of an augmented channel matrix (hereinafter abbreviated as QRMMSE detection). However, a direct bias removal in this particular case is computationally complex. Furthermore, calculation of noise variance that is required for outer channel decoding may also be difficult. Therefore, a simpler and more efficient technique for removing the bias is considered that provides better detection accuracy compare to the biased MMSE detection.

The maximum likelihood (ML) detection may also be applied at the receiver side to mitigate multiple access interference and to reduce the effects of channel noise. The ML algorithm is optimal in terms of detection accuracy because likelihoods for all symbol vectors that can be possibly transmitted from a plurality of antennas are evaluated. On the other side, computational complexity may be large especially in systems with high spectral efficiency that employ large number of transmit antennas and high-order modulation types.

The ML detection may also be implemented with a preprocessing based on QR decomposition (hereinafter abbreviated as QRML), and therefore it can share common algorithmic operations with the QRMMSE detection allowing a possibility for hybrid architecture that may perform both aforementioned detection algorithms.

Although the ML detection typically achieves better error rate performance than the MMSE detection, there are certain conditions where the MMSE solution may be more beneficial, not only because of the smaller computational complexity. The MMSE detection may be a better solution if user equipment is around the cell edge performing the handover when the information about modulation type of other cell is not known to the mobile user. Information about the modulation type is required to perform the maximum-likelihood candidate search, while it is not necessary for the MMSE detection. Furthermore, if the space-time diversity is utilized at the transmitter (such as Alamouti scheme), MMSE and ML detection algorithms provide very similar error rate performance, while the computational complexity and power consumption of the MMSE detection may be substantially lower than for the ML solution.

SUMMARY

Certain embodiments of the present disclosure provide a method for decoding data transmitted in a multiple-input multiple-output (MIMO) wireless communications system. The method generally includes receiving, on multiple receive antennas, data streams transmitted from multiple transmit antennas and selecting between a maximum-likelihood (ML) detection algorithm or a minimum mean square error (MMSE) detection algorithm for decoding the data streams.

Certain embodiments of the present disclosure provide an apparatus for decoding data transmitted in a multiple-input multiple-output (MIMO) wireless communications system. The apparatus generally includes logic for receiving, on multiple receive antennas, data streams transmitted from multiple transmit antennas and logic for selecting between a maximum-likelihood (ML) detection algorithm or a minimum mean square error (MMSE) detection algorithm for decoding the data streams.

Certain embodiments of the present disclosure provide an apparatus for decoding data transmitted in a multiple-input multiple-output (MIMO) wireless communications system. The apparatus generally includes means for receiving, on multiple receive antennas, data streams transmitted from multiple transmit antennas and means for selecting between a maximum-likelihood (ML) detection algorithm or a minimum mean square error (MMSE) detection algorithm for decoding the data streams.

Certain embodiments of the present disclosure generally include a computer-program product for decoding data transmitted in a multiple-input multiple-output (MIMO) wireless communications system, including a computer readable medium having instructions stored thereon, the instructions being executable by one or more processors. The instructions generally include instructions for receiving, on multiple receive antennas, data streams transmitted from multiple transmit antennas and instructions for selecting between a maximum-likelihood (ML) detection algorithm or a minimum mean square error (MMSE) detection algorithm for decoding the data streams.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain embodiments of the present disclosure provide a unified hybrid MIMO receiver combining unbiased MMSE equalization based on QR decomposition (QRMMSE) and a QRML detection algorithm. Due to the potential sharing of certain computations with the QRML detection algorithm, the QRMMSE solution may be achieved with relatively small computational complexity overhead.

The word "exemplary" is used herein to mean "serving as an example, instance, or illustration." Any embodiment described herein as "exemplary" is not necessarily to be construed as preferred or advantageous over other embodiments.
Exemplary Wireless Communication System The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
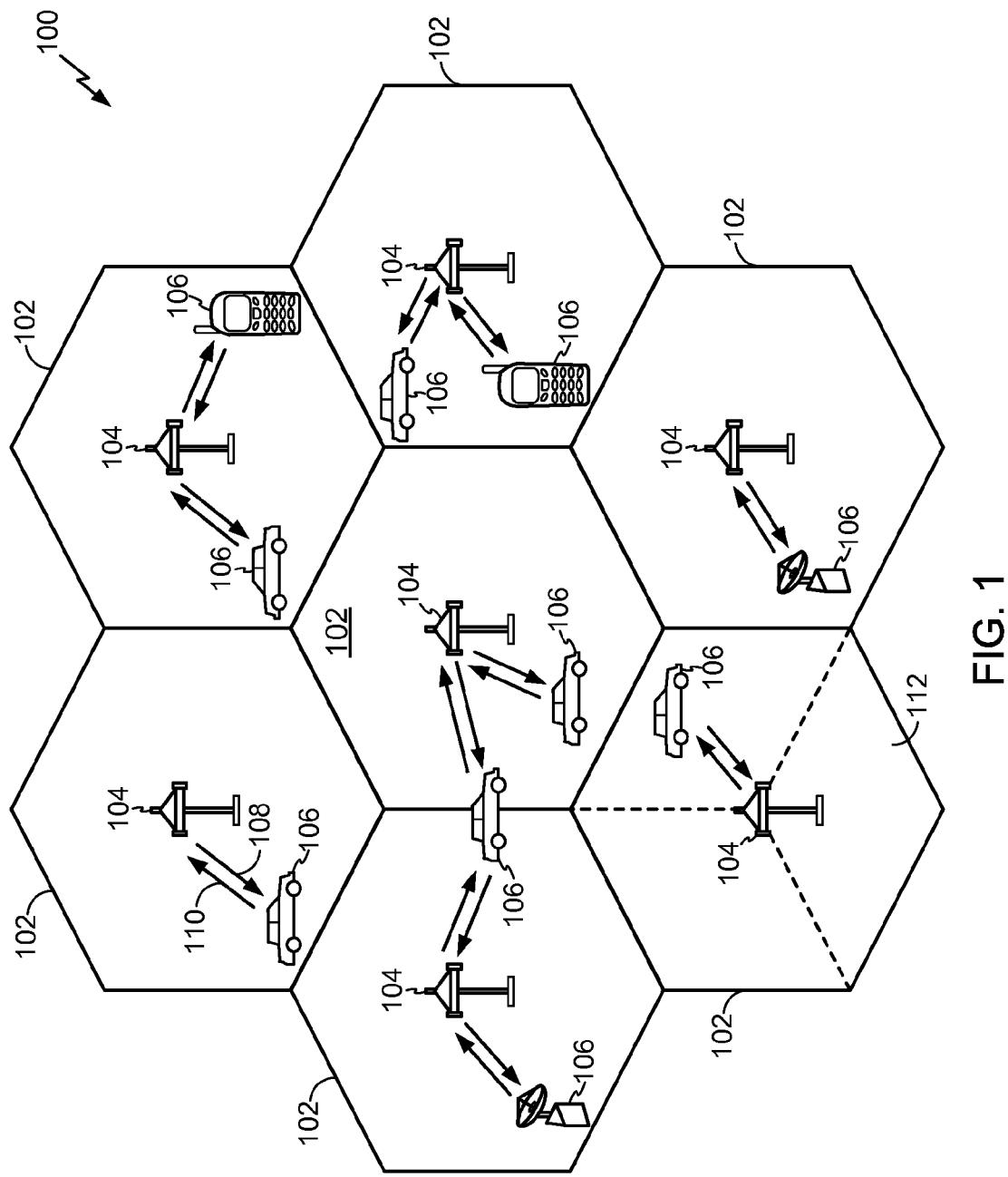
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
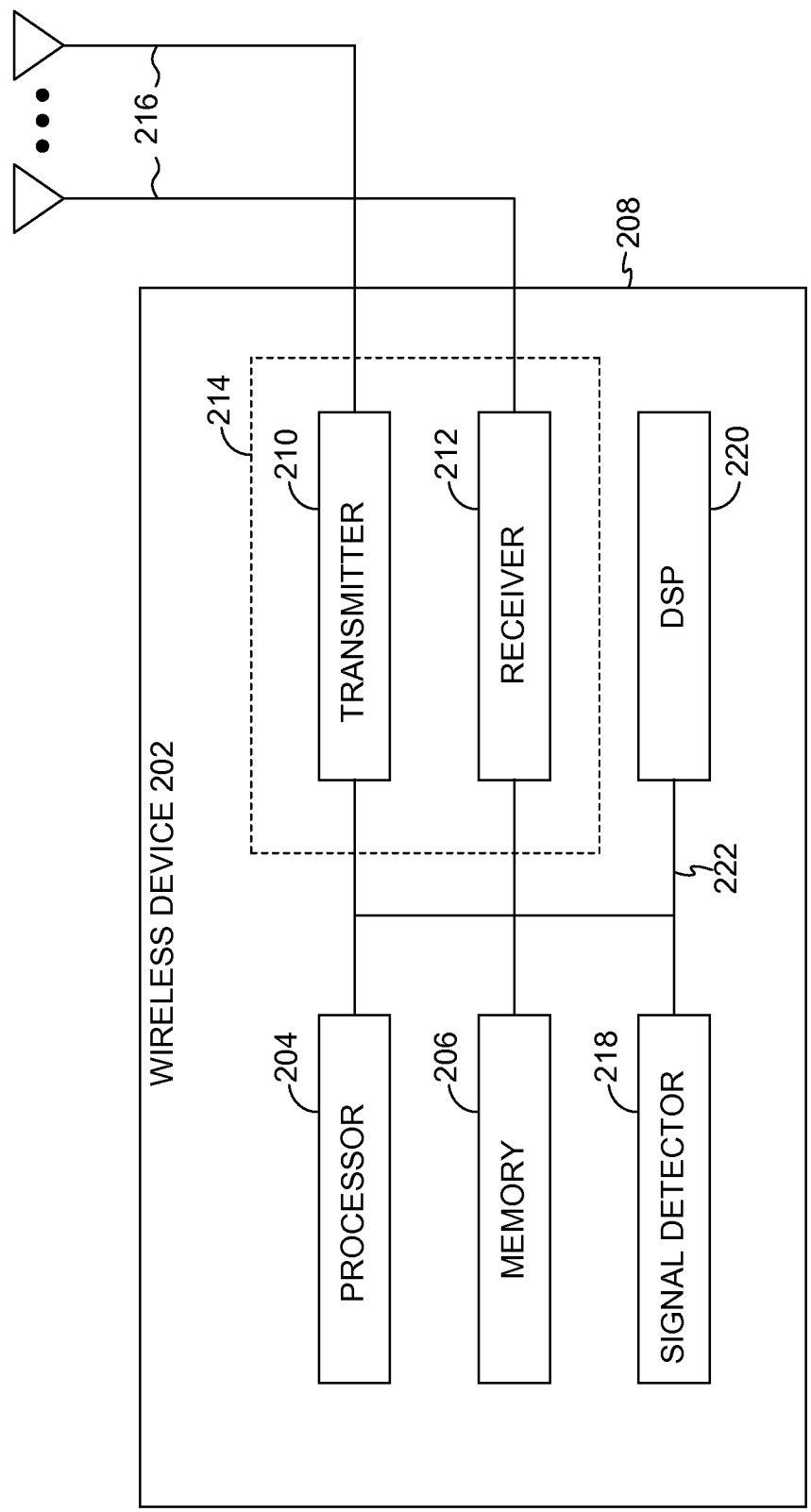
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
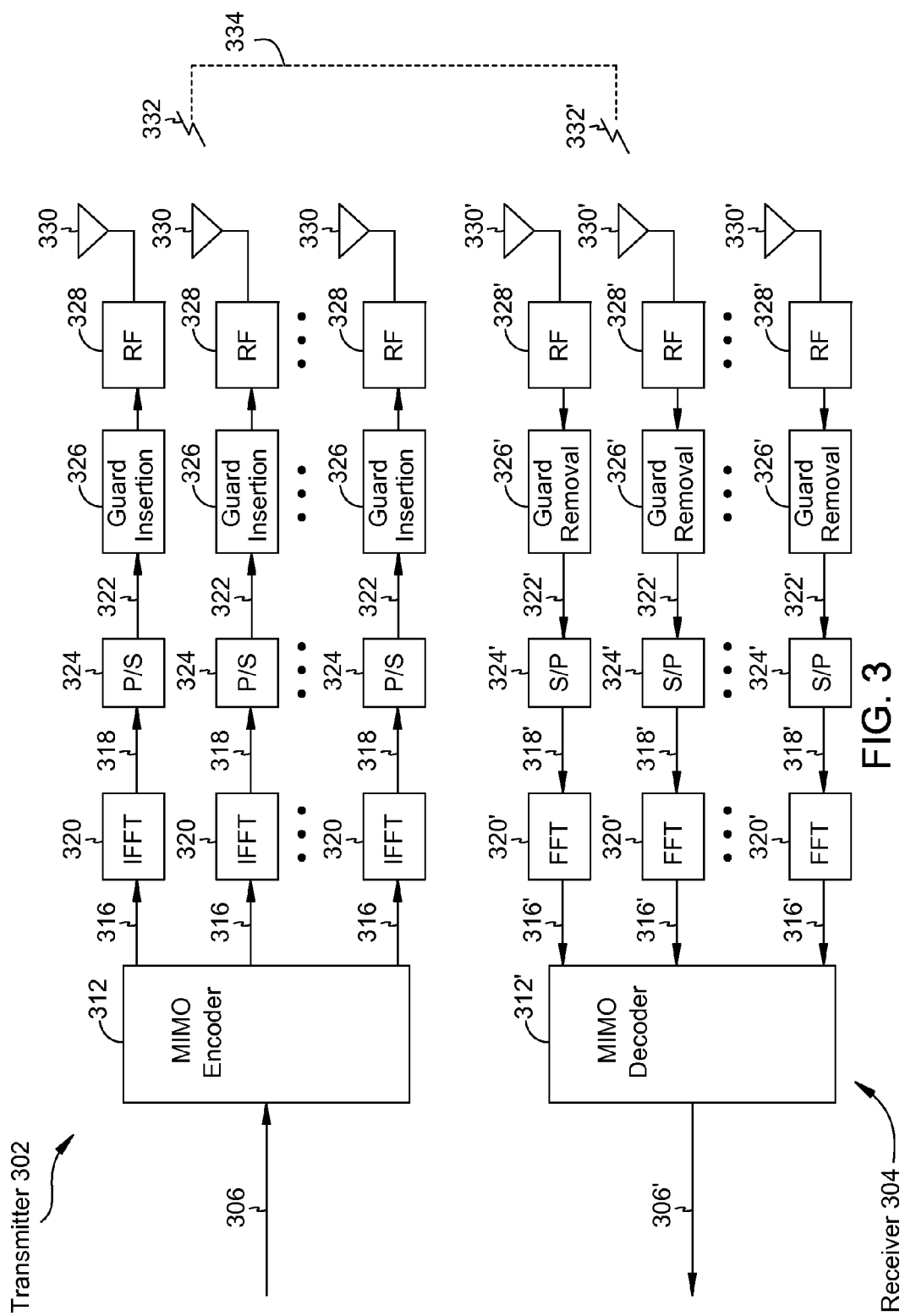
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to MIMO encoder 312. The MIMO encoder may encode the data 306 and map them onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc., or null (zero valued) modulation if the sub-carrier is not assigned. Thus, the MIMO encoder 312 may output $N_{FFT}$ parallel symbol streams 316 per antenna path, each symbol stream 316 corresponding to $N_{FFT}$ orthogonal subcarriers of the inverse fast Fourier transforms (IFFTs) 320. These $N_{FFT}$ parallel symbol streams 316 are represented in the frequency domain and may be converted into $N_{FFT}$ parallel time domain sample streams 318 by IFFT components 320.

A brief note about terminology will now be provided. $N_T \times N_{FFT}$ parallel modulations in the frequency domain are equal to $N_T \times N_{FFT}$ modulation symbols in the frequency domain, which are equal to $N_T$ parallel $N_{FFT}$ mapping and $N_T$ parallel $N_{FFT}$-point IFFTs in the frequency domain, which is equal to $N_T$ (useful) OFDM symbols in the time domain, each of which is equal to $N_{FFT}$ samples in the time domain, where $N_T$ is the number of transmit antennas 330. After inserting Guard samples, one OFDM symbol in the time domain, $N_S$, is equal to $N_{CP}$ (the number of guard samples per OFDM symbol)+$N_{FFT}$ (the number of useful samples per OFDM symbol) samples.

For one of $N_T$ antenna path, the $N_{FFT}$ parallel time domain sample streams 318 may be converted into an OFDM/OFDMA symbol stream 322 by parallel-to-serial (P/S) converter 324. Guard insertion component 326 may insert guard interval between successive OFDM/OFDMA symbols in the OFDM/OFDMA symbol stream 322 generating $N_S = N_{CP} + N_{FFT}$ samples. The signal from the guard insertion component 326 may then be up-converted to a desired transmit frequency band by a radio frequency (RF) front end component 328, and the antenna array 330 may then transmit the resulting signal 332 across multiple spatial subchannels 334.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a plurality of spatial subchannels 334. When a signal 332' is received by the antenna array 330', the received signal 332' may be downconverted to a baseband signal by RF front end components 328'. Guard removal components 326' may then remove the guard intervals that were inserted between OFDM/OFDMA symbols by the guard insertion components 326.

For one of $N_T$ antenna path, the output of the guard removal component 326' may be provided to S/P converter 324'. The S/P converter 324' may divide the OFDM/OFDMA symbol stream 322' into the $N_{FFT}$ parallel time-domain symbol streams 318', each of which corresponds to one of the $N_{FFT}$ orthogonal subcarriers. Fast Fourier transform (FFT) component 320' may convert the $N_{FFT}$ parallel time-domain symbol streams 318' into the frequency domain and output $N_{FFT}$ parallel frequency-domain symbol streams 316'.

A MIMO decoder 312' may perform the inverse of the encoding and symbol mapping operations that were performed by the MIMO encoder 312 thereby outputting the same number of data stream 306' as the data 306. Ideally, this data stream 306' corresponds to the data 306 that was provided as input to the transmitter 302. Note that elements 312', 316', 320', 318' and 324' may all be found on a in a baseband processor 340'.

Exemplary MIMO-OFDM System Model

Figure 4:
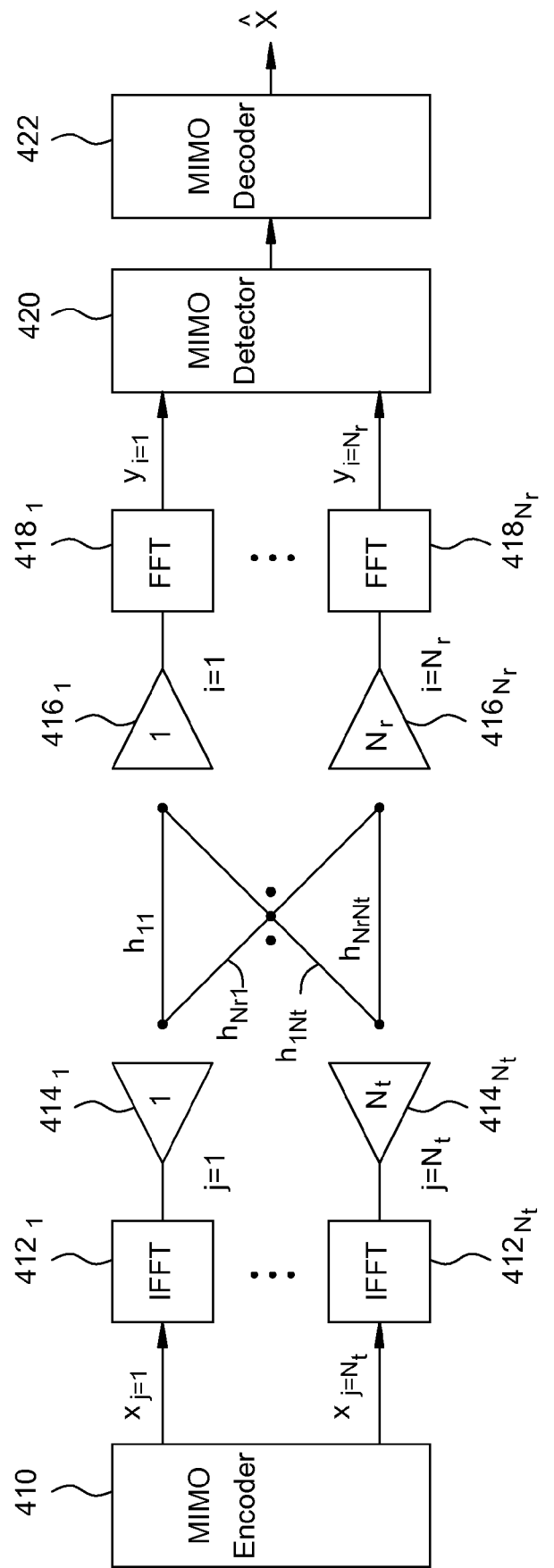
FIG. 4 illustrates a block diagram of a MIMO-OFDM wireless system used for deriving a system model.

FIG. 4 shows a block diagram of a generic multiple-input multiple-output (MIMO) OFDM wireless communication system with $N_t$ transmit and $N_r$ receive antennas. The system model for the $k^{th}$ sub-carrier (frequency subchannel) can be represented with linear equation:

$$y_k = H_k x_k + n_k, \; k=1, 2, \ldots, N_{FFT} \tag{1}$$

where $N_{FFT}$ is the number of orthogonal sub-carriers (frequency bins) in a MIMO wireless system.

In equations and accompanying disclosure below, the sub-carrier index k is omitted for simplicity. Therefore, the system model can be re-written in the simple notation as:

$$y = Hx + n \tag{2}$$

$$y = [y_1 \; y_2 \; \ldots \; y_{N_r}]^T \tag{3}$$

$$H = [h_1 \; h_2 \; \ldots \; h_{N_t}] = \begin{bmatrix} h_{11} & h_{12} & \ldots & h_{1N_t} \\ & \ldots & & \\ h_{N_r 1} & h_{N_r 2} & \ldots & h_{N_r N_t} \end{bmatrix} \tag{4}$$

$$x = [x_1 \; x_2 \; \ldots \; x_{N_t}]^T \tag{5}$$

$$n = [n_1 \; n_2 \; \ldots \; n_{N_r}]^T \tag{6}$$

where y is $[N_r \times 1]$ received symbol vector, H is $[N_r \times N_t]$ channel matrix and $h_j$ is its $j^{th}$ column vector that contains channel gains between the transmit antenna j and all $N_r$ receive antennas, x is $[N_t \times 1]$ transmitted symbol vector, n is $[N_r \times 1]$ complex noise vector with covariance matrix $E(nn^H)$.

As illustrated in FIG. 4, the transmission signal may be first encoded by MIMO encoder 410. A redundancy may be included to protect the information data during the transmission over noisy wireless channels. An encoded signal can then be split into $N_t$ spatial data streams $x_1, x_2, \ldots, x_{N_t}$, as shown in FIG. 4. A plurality of spatial data streams can be converted into a time domain by utilizing Inverse Fast Fourier Transform (IFFT) units $412_1, \ldots, 412_{N_t}$. The signal may then be up converted to a desired transmission frequency band and transmitted from $N_t$ transmit antennas $4141, \ldots, 414_{N_t}$ over $N_r \cdot N_t$ spatial subchannels.

$N_r$ receive antennas $416_1, \ldots, 416_{N_r}$ are employed at the receiver. Received data streams can be converted back into a frequency domain by using the Fast Fourier Transform (FFT) units $418_1, \ldots, 418_{N_r}$. A frequency domain signal may be input into a MIMO detector 420 that generates reliability messages for coded bits transmitted over a plurality of spatial subchannels. A reliability message represents a probability that the particular transmitted coded bit is either bit "0" or bit "1". This information can be passed to the outer MIMO channel decoder 422, and the estimated information data $\hat{x}$ for a plurality of spatial subchannels (transmit antennas) are available after removing the redundancy included at the transmitter.

Exemplary Linear MMSE Detection

In a linear MMSE detector (channel equalizer), $G_{MMSE}$ can be represented in the following form:

$$G_{MMSE} = (H^H H + \sigma_n^2 I_{N_t})^{-1} H^H \tag{7}$$

where $\sigma_n^2$ is the variance of noise at the receiver, and $I_{N_t}$ is the identity matrix of size $[N_t \times N_t]$. A signal obtained after applying the MMSE filtering is:

$$\hat{y} = G_{MMSE} y = (H^H H + \sigma_n^2 I_{N_t})^{-1} H^H y \tag{8}$$

Figure 6:
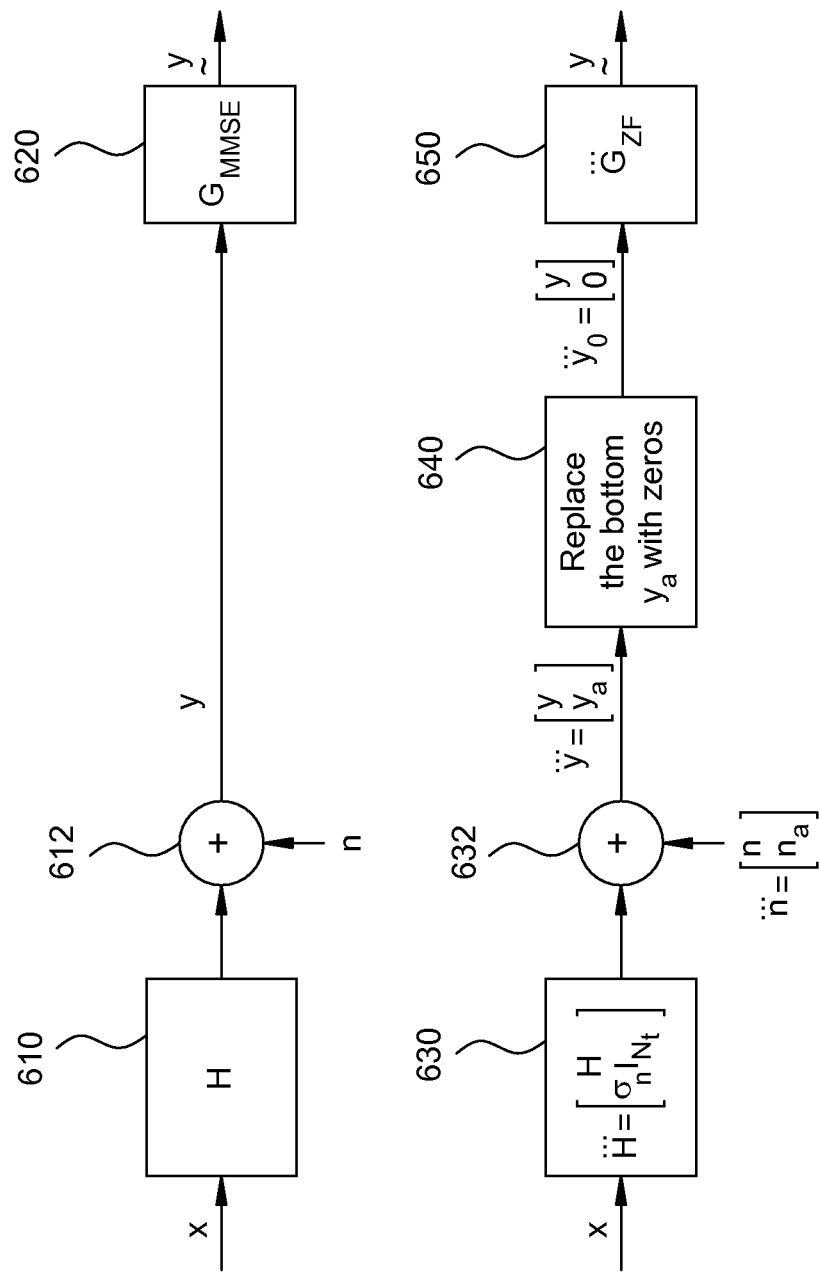
FIG. 6 shows a block diagram that illustrates equivalence between an MMSE equalization of original channel and a zero-forcing (ZF) equalization of an augmented channel.

The linear system model described by equation (2) is illustrated in FIG. 6. Transmission of signal x over a plurality of spatial subchannels using a particular frequency subchannel is illustrated with block 610, and the effect of channel noise at the receiver is represented with adder 612. The MMSE filtering is then applied on the received symbol vector y as illustrated by block 620.

The error covariance matrix of the MMSE channel equalization is equal to:

$$C_a = E\{(y-x)(y-x)^H\} = \sigma_n^2 (H^H H + \sigma_n^2 I_{N_t})^{-1} \tag{9}$$

Figure 5:
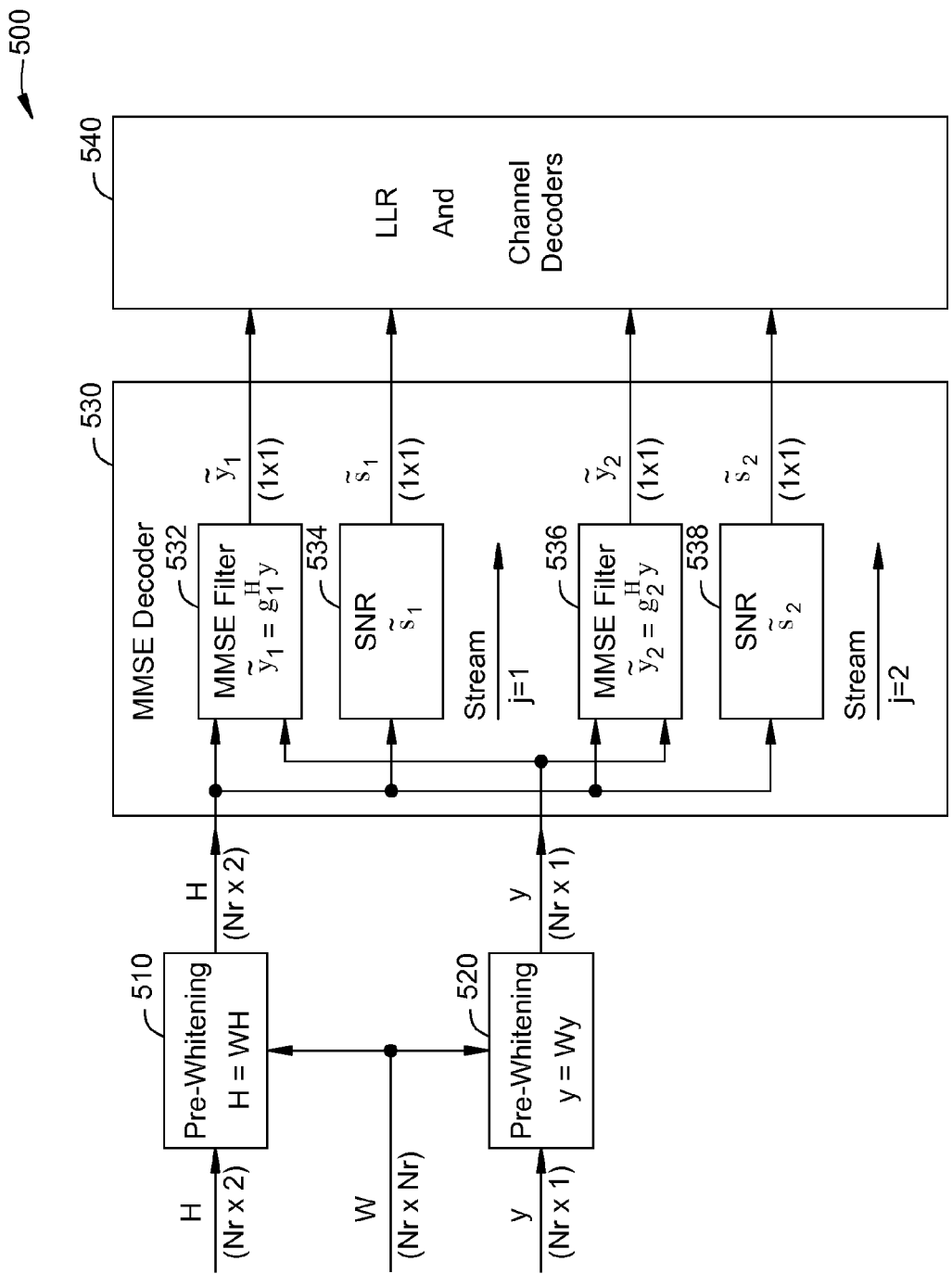
FIG. 5 illustrates an example block diagram of MMSE based detector applied in a MIMO-OFDM system with two transmit antennas.

FIG. 5 shows a block diagram of an MMSE detector for the example case of two transmit and $N_r$ receive antennas. Before performing the MMSE detection, the received signal y and the matrix of channel estimates H for a single subcarrier and a plurality of spatial subchannels may be "pre-whitened" by applying a whitening filter W, as illustrated with units 510 and 520 in FIG. 5:

$$y = Wy \tag{10}$$

$$H = WH \tag{11}$$

$$W = R_{nn}^{-1/2} \tag{12}$$

where $R_{nn}$ is a noise co-variance matrix of size $[N_r \times N_r]$.

Following the pre-whitening, the MMSE decoder can be applied as illustrated with unit 530 in FIG. 5 in the case of two spatial data streams. Based on equation (7) and equation (4), vectors $g_1$ and $g_2$ of MMSE filter coefficients that correspond to the first and second spatial data stream respectively can be derived as:

$$g_1 = \left(h_1 - (h_2^H h_1) h_2 \frac{1}{1 + |h_2|^2}\right) \tag{13}$$

and $$g_2 = \left(h_2 - (h_1^H h_2) h_1 \frac{1}{1 + |h_1|^2}\right)$$

Vectors of MMSE filter coefficients can be applied on the pre-whitened received signal. The demodulated biased signal transmitted from the $j^{th}$ antenna may be determined as the following inner product of two vectors of size $[N_r \times 1]$:

$$\tilde{y}_j = g_j^H y \quad (14)$$

The MMSE filtering is illustrated by equalization units 532 and 536 in FIG. 5 for detection of the first and second spatial data stream, respectively.

The bias terms $z_1$ and $z_2$ for signals transmitted from the first and second antenna are, respectively:

$$z_1 = \left(|h_1|^2 - \frac{|h_2^H h_1|^2}{1+|h_2|^2}\right) \text{ and } z_2 = \left(|h_2|^2 - \frac{|h_1^H h_2|^2}{1+|h_1|^2}\right) \quad (15)$$

The variance of interference that originates from the $j^{th}$ transmit antenna ($j^{th}$ spatial subchannel) may be equal to the corresponding bias term:

$$\sigma_j^2 = z_j \quad (16)$$

Estimate of the effective signal-to-noise-ratio (SNR) for the $j^{th}$ transmission channel (channel between the $j^{th}$ transmit and all $N_r$ receive antennas) may be computed in units 534 and 538 for the first and second spatial data stream, respectively:

$$\tilde{s}_j = z_j^2/\sigma_j^2 = z_j, j=1, 2 \quad (17)$$

The effective signal model for the $j^{th}$ spatial subchannel used for calculation of log-likelihood ratios (hereinafter abbreviated as LLRs) for coded bits transmitted from the $j^{th}$ antenna can be represented as:

$$\tilde{y}_j = \tilde{s}_j x_j + \sqrt{\tilde{s}_j} n_j, \ n_j \sim N(0,1) \quad (18)$$

For the signal model given by equation (18), the pre-whitening can be assumed resulting into unitary variance of the effective noise, and therefore it does not need to be calculated. Once the LLRs are computed, they may be passed to the outer channel decoder for estimating information bits transmitted from a plurality of spatial subchannels. The common unit for calculation of LLRs and for channel decoding is illustrated with block 540 in FIG. 5.

Exemplary QR Decomposition

For certain embodiments, it may be assumed that matrix of channel estimates H is $[N_r \times N_t]$ with linearly independent columns and the $j^{th}$ column vector of matrix H, $h_j$ is $[N_r \times 1]$ vector. The Gram-Schmidt QR decomposition (GSQRD) determines an orthonormal basis for the column space of matrix H. As a result, it is possible to obtain matrix Q and matrix R such that:

$$H = QR \quad (19)$$

where matrix Q with dimension $[N_r \times N_t]$ is a unitary matrix with orthonormal columns $q_j, j=1, 2, \ldots, N_t$, with dimension $[N_r \times 1]$. The matrix R is a square, nonsingular and upper-triangular matrix with dimension $[N_t \times N_t]$. The $j^{th}$ column of matrix R is $r_j$ with dimension $[N_t \times 1]$ and the diagonal elements of matrix R are real numbers.

The procedure of GSQRD algorithm may be described as follows. For the first column, the following operations may be performed:

$$w = h_1 \quad (20)$$

$$q_j = \frac{w}{\|w\|} \quad (21)$$

$$r_{11} = \|w\| \quad (22)$$

For every next $j^{th}$ column (j=2, 3, ..., $N_t$) the following recursive procedure may be applied:

$$w = h_j - (q_1^H h_j)q_1 - (q_2^H h_j)q_2 - \ldots - (q_{j-1}^H h_j)q_{j-1} \quad (23)$$

$$q_j = \frac{w}{\|w\|} \quad (24)$$

$$r_j = \begin{bmatrix} q_1^H h_j \\ q_2^H h_j \\ \ldots \\ q_{j-1}^H h_j \\ \|w\| \\ 0 \\ 0 \\ \ldots \\ 0 \end{bmatrix} \quad (25)$$

By performing the recursive algorithm, the QR decomposition of arbitrary size can be performed without a matrix inversion, and only with limited number of real divisions specified by equations (21) and (24).

As an illustrative example, the Gram-Schmidt QR decomposition in a system with two transmit and either two or four receive antennas may be considered. The system model in the case of two or four receive antennas may be given as:

$$y = Hx + n \quad (26)$$

$$H = (h_1 h_2) = \begin{pmatrix} h_{11} & h_{12} \\ h_{21} & h_{22} \end{pmatrix} \text{ or } = \begin{pmatrix} h_{11} & h_{12} \\ h_{21} & h_{22} \\ h_{31} & h_{32} \\ h_{41} & h_{42} \end{pmatrix} \quad (27)$$

The QR decomposition of the channel matrix H can be defined as:

$$H = QR \quad (28)$$

where matrices Q and R are given as:

$$Q = (q_1 q_2) = \begin{pmatrix} q_{11} & q_{12} \\ q_{21} & q_{22} \end{pmatrix} \text{ or } = \begin{pmatrix} q_{11} & q_{12} \\ q_{21} & q_{22} \\ q_{31} & q_{32} \\ q_{41} & q_{42} \end{pmatrix} \quad (29)$$

$$R = (r_1 r_2) = \begin{pmatrix} r_{11} & r_{12} \\ 0 & r_{22} \end{pmatrix} \quad (30)$$

For the detection of the second spatial data stream, the permutation may not be required before the QR decomposition. However, the processing order may need to be changed (e.g., the subscripts 1 and 2 in $h_j$ may need to be swapped) for detection of the first spatial data stream, i.e. permutation $H = (h_2 h_1)$ is performed before the QR decomposition.

The columns of unitary matrix Q from equation (29) may be computed by utilizing appropriate spatial subchannels (columns of matrix H) and diagonal elements of matrix R as:

$$q_1 = h_1 \frac{1}{\|r_{11}\|} = h_1 \frac{1}{\|h_1\|} \quad (31)$$

$$q_2 = \left(h_2 - (h_1^H h_2)h_1 \frac{1}{\|h_1\|^2}\right)\frac{1}{r_{22}} \quad (32)$$

Elements of upper triangular matrix R from equation (30) may be computed as:

$$r_{11} = \|h_1\| \quad (33)$$

$$r_{12} = h_1^H h_2 \frac{1}{\|h_1\|} \quad (34)$$

$$r_{22} = \left\|h_2 - (h_1^H h_2)h_1 \frac{1}{\|h_1\|^2}\right\| = \sqrt{|h_2|^2 - |h_1^H h_2|^2 \frac{1}{|h_1|^2}} \quad (35)$$

It can be observed from equations (33) and (35) that diagonal elements of matrix R are real numbers.

Exemplary Unbiased MMSE Detection Using QR Decomposition

The system model with augmented channel matrix $\ddot{H}$ (matrix of frequency subchannels), also illustrated in FIG. 6 may be defined as:

$$\ddot{y} = \ddot{H}x + \ddot{n}, \text{ where } \ddot{H} = \begin{bmatrix} H \\ \sigma_n I_{N_t} \end{bmatrix} \quad (36)$$

is an augmented channel matrix (unit 630), $$\ddot{y} = \begin{bmatrix} y \\ y_a \end{bmatrix}$$

is an aumented received signal vector, $$\ddot{n} = \begin{bmatrix} n \\ n_a \end{bmatrix}$$

is an augmented complex noise vector added to the received vector (illustrated with adder 632), $\ddot{H}$ is $[(N_r+N_t) \times N_t]$, $\ddot{y}$ is $[(N_r+N_t) \times 1]$, x is $[N_t \times 1]$, and $\ddot{n}$ is $[(N_r+N_t) \times 1]$.

It can be shown that a zero-forcing (ZF) equalizer of an augmented channel matrix $\ddot{H}$ is equivalent to the MMSE equalization of the original channel matrix H. The ZF equalizer of an augmented channel may be defined as:

$$\ddot{G}_{ZF} = mm\left(\ddot{H}^H \ddot{H}\right)^{-1} \ddot{H}^H \quad (37)$$

$$= \left([H^H \; \sigma_n I_{N_t}]\begin{bmatrix} H \\ \sigma_n I_{N_t} \end{bmatrix}\right)^{-1} [H^H \; \sigma_n I_{N_t}]$$

$$= (H^H H + \sigma_n^2 I_{N_t})^{-1} [H^H \; \sigma_n I_{N_t}]$$

If an augmented portion $y_a$ in $\ddot{y}$ is replaced with zeros (unit 640), i.e., $$\ddot{y}_0 = \begin{bmatrix} y \\ 0 \end{bmatrix} \quad (38)$$

then, the following equality holds after the ZF equalization (unit 650):

$$\ddot{G}_{ZF} \ddot{y}_0 = G_{MMSE} y \quad (39)$$

$$= (H^H H + \sigma_n^2 I_{N_t})^{-1} H^H y$$

After comparing equation (39) and equation (8), it can be observed that the ZF equalization of the augmented channel matrix $\ddot{H}$ is equivalent to the MMSE equalization of the original matrix H. FIG. 6 illustrates equivalence of these two approaches where filtered outputs from equations (8) and (39) may be identical.

Rotation of the received signal with a unitary matrix $Q^H$ (Hermitian version of a unitary matrix obtained from the QR decomposition of the original channel matrix) results in the same signal that is generated with the ZF equalization. Therefore, the algorithmic equivalence illustrated in FIG. 6 may lead to the fact that the MMSE detection can be implemented with QR decomposition of an augmented channel matrix.

Figure 7:
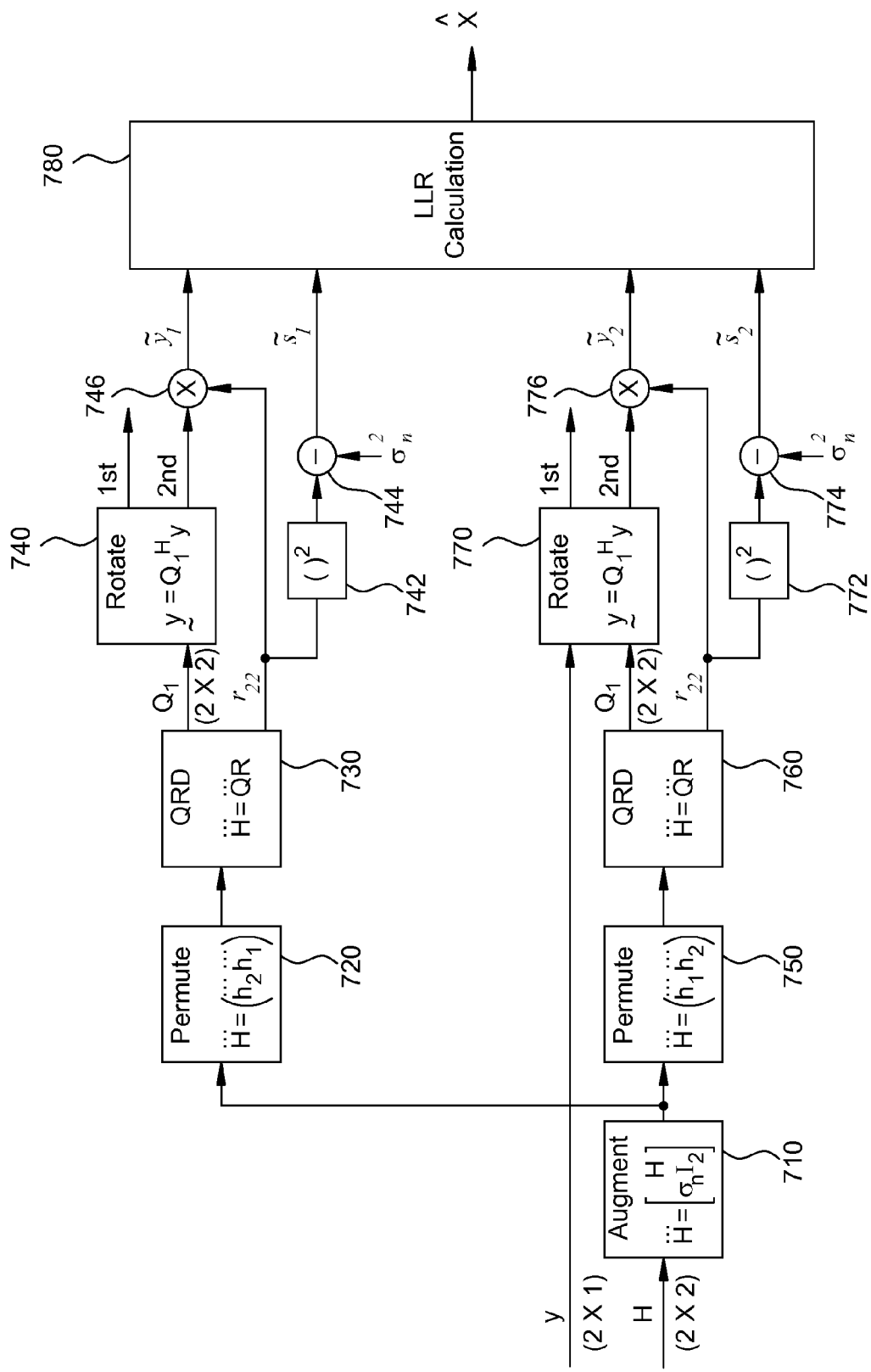
FIG. 7 illustrates an example block diagram of QRMMSE detection with a bias removal applied in a MIMO-OFDM system with two transmit and two receive antennas.

To illustrate the MMSE detection based on QR decomposition (QRMMSE detection), it may be described without losing a generality, a wireless system with two transmit antennas. An example block diagram of a MIMO receiver that performs QRMMSE detection of two spatial data streams transmitted over two spatial subchannels (pair of transmit antennas) is shown in FIG. 7.

The channel matrix is first augmented (unit 710), and then its columns are permuted such that the last column of the resultant permuted matrix corresponds to the spatial subchannel (spatial data stream) that is currently being decoded. In the illustrated example, permutation units 720 and 750 in FIG. 7 are applied for decoding of the first and second spatial data streams, respectively. The QR decomposition of permuted channel matrices may be performed by units 730 and 760 for decoding of the first and second spatial data stream, respectively.

The QR decomposition of an augmented channel may be represented as:

$$\ddot{H} = \begin{bmatrix} H \\ \sigma_n I_{N_t} \end{bmatrix} = \ddot{Q} R = \begin{bmatrix} Q_1 \\ Q_2 \end{bmatrix} R = \begin{bmatrix} Q_1 R \\ Q_2 R \end{bmatrix}, \quad (40)$$

where matrix $\ddot{Q}$ ($\in C^{(N_r+N_t) \times N_t}$) consists of orthonormal column vectors and R($\in C^{N_t \times N_t}$) is an upper triangular matrix with real numbered diagonal elements. From equation (40) it follows that:

$$\sigma_n I_{N_t} = Q_2 R$$

$$\ddot{Q}^H \ddot{H} = [Q_1^H \; Q_2^H]\begin{bmatrix} H \\ \sigma_n I_{N_t} \end{bmatrix} = Q_1^H H + \sigma_n Q_2^H = R \quad (42)$$

$$Q_1^H H = R - \sigma_n Q_2^H \quad (43)$$

where $Q_1$ is $[N_r \times N_t]$ and $Q_2$ is $[N_t \times N_t]$.

As shown by equation (39), instead of performing MMSE equalization of the original channel matrix, zero-forcing (ZF) operation can be applied on augmented channel matrix. Units 740 and 770 in FIG. 7 perform zero-forcing filtering (rotation) of the received vector y, and the result is biased filtered output for the first and second spatial data stream, respectively. It can be observed from equation (38) that only an upper half of unitary matrix Q (matrix $Q_1$ from equation (40)) may be required to rotate the received symbol vector y. The filtered output with a bias introduced by the MMSE operation may, therefore, be expressed as:

$$\tilde{y} = Q_1^H y = Q_1^H (Hx+n) = Q_1^H Hx + Q_1^H n \quad (44)$$

From equation (43) it follows that:

$$\tilde{y} = (R - \sigma_n Q_2^H)x + Q_1^H n \quad (45)$$

For an exemplary MIMO-OFDM system with two transmit and two receive antennas the following expressions can be specified:

$$x = \begin{bmatrix} x_1 \\ x_2 \end{bmatrix}, \quad (46)$$

$$Q_1 = \begin{bmatrix} p_1 & q_1 \\ p_2 & q_2 \end{bmatrix},$$

$$Q_2 = \begin{bmatrix} p_3 & q_3 \\ 0 & q_4 \end{bmatrix},$$

$$n = \begin{bmatrix} n_1 \\ n_2 \end{bmatrix},$$

$$R = \begin{bmatrix} r_{11} & r_{12} \\ 0 & r_{22} \end{bmatrix}$$

As an illustrative example, decoding of the second spatial data stream $x_2$ may be considered. Because of equality (41) the matrix $Q_2$ is upper triangular. Therefore equation (45) can be rewritten as:

$$\begin{bmatrix} \tilde{y}_1 \\ \tilde{y}_2 \end{bmatrix} = \begin{bmatrix} (r_{11} - \sigma_n p_3^*)x_1 + r_{12}x_2 + p_1^* n_1 + p_2^* n_2 \\ (r_{22} - \sigma_n q_4^*)x_2 - \sigma_n q_3^* x_1 + q_1^* n_1 + q_2^* n_2 \end{bmatrix} \quad (47)$$

The term $(r_{11}-\sigma_n p_3^*)$ represents the bias on the signal transmitted from the first antenna (first spatial data stream), and the term $(r_{22}-\sigma_n q_4^*)$ represents the bias on the signal transmitted from the second antenna (second spatial data stream).

As an example, it is first considered removing a bias from the second spatial data stream. In one embodiment a bias may be removed by dividing the second biased data stream with the bias term $(r_{22}-\sigma_n q_4^*)$. However, division is not a desirable arithmetic operation for efficient hardware implementation due to a long latency and large area size of divider. Also, division operation may generate a very complex noise plus interference terms that prevents accurate calculation of noise variance, which is required for the calculation of log-likelihood ratios (LLRs) of coded bits. Instead of a conventional bias removal approach based on direct division operation, a simpler bias removal technique can be considered.

If the second row of equation (47) is multiplied with the last diagonal element $r_{22}$ of an upper triangular matrix R (illustrated with multipliers 776 and 746 in FIG. 7 for decoding of the second and first spatial stream, respectively), the unbiased filtered output for the second spatial stream may be obtained from the following equation:

$$\tilde{y}_2 = (r_{22}^2 - \sigma_n r_{22} q_4^*)x_2 + r_{22}(-\sigma_n q_3^* x_1 + q_1^* n_1 + q_2^* n_2) = h_{\mathit{eff}} x_2 + n_{\mathit{eff}} \quad (48)$$

Since, in accordance with equation (41), $r_{22}q_4=\sigma_n$ (element $q_4$ is a real number), the effective channel for the second spatial data stream may be obtained from the following equation:

$$h_{\mathit{eff}} = r_{22}^2 - \sigma_n r_{22} q_4^* = r_{22}^2 - \sigma_n^2 = \tilde{s}_2 \quad (49)$$

Computation of the effective subchannel that corresponds to the second spatial stream is illustrated in FIG. 7 by applying the square multiplier 772 on the last diagonal element $r_{22}$ of matrix R, and the subtraction unit 774. A similar processing flow can be applied for the computation of effective channel that corresponds to the first spatial data stream, which is represented with the square multiplier 742 and the subtraction unit 744.

Regarding the noise variance, since $E[x_2 x_2^*]=1$ and the transmission signal $x_2$ is independent from the noise components related to the first and second spatial subchannels, the variance of the effective noise that corresponds to the second spatial subchannel may be computed as:

$$\sigma_{n_{\mathit{eff}}}^2 = r_{22}^2(\sigma_n^2 q_3^2) + r_{22}^2(q_1^2 + q_2^2)\sigma_n^2 \quad (50)$$

From equation (40) it can be observed that $q_1^2 + q_2^2 + q_3^2 + q_4^2 = 1$. Then equation (50) becomes:

$$\sigma_{n_{\mathit{eff}}}^2 = r_{22}^2 \sigma_n^2 (q_3^2 + q_1^2 + q_2^2) \quad (51)$$
$$= r_{22}^2 \sigma_n^2 (1 - q_4^2)$$
$$= \sigma_n^2 (r_{22}^2 - r_{22}^2 q_4^2)$$
$$= \sigma_n^2 (r_{22}^2 - \sigma_n^2)$$
$$= \sigma_n^2 h_{\mathit{eff}}$$

After the bias is removed, the effective signal model for the second spatial subchannel is:

$$\tilde{y}_2 = h_{\mathit{eff}} x + n_{\mathit{eff}} \text{ with } h_{\mathit{eff}} = r_{22}^2 - \sigma_n^2 \text{ and } \sigma_{n_{\mathit{eff}}}^2 = \sigma_n^2 h_{\mathit{eff}} \quad (52)$$

The log likelihood ratios (LLRs) for the coded bits that correspond to the second spatial subchannel can be calculated by utilizing $\tilde{y}_2$, $\tilde{s}_2 = h_{\mathit{eff}}$ and $\sigma_{n_{\mathit{eff}}}^2$ as it is illustrated with unit 780 in FIG. 7. The signal model for calculation of LLRs for the second data stream is:

$$\tilde{y}_2 = \tilde{s}_2 x_2 + \sqrt{\tilde{s}_2}\, n_2, \quad (53)$$

where $n_2 \sim N(0, \sigma_n^2)$ and $\tilde{s}_2 = r_{22}^2 - \sigma_n^2$. Computation of LLRs for coded bits that belong to the first spatial data stream can be performed in the similar manner, which is also illustrated in FIG. 7 where signals $\tilde{y}_1$ and $\tilde{s}_1 = h_{\mathit{eff}}$ are input into the LLR calculation unit 780.

If the pre-whitening is applied on channel estimates and on received samples, the effective noise variance at the receiver becomes unitary ($\sigma_n^2=1$) and it is not required to be calculated. The signal model for the computations of LLRs that correspond to the second spatial data stream now becomes:

$$\tilde{y}_2 = \tilde{s}_2 x_2 + \sqrt{\tilde{s}_2}\, n_2, \quad (54)$$

where $n_2 \sim N(0,1)$ and $\tilde{s}_2 = r_{22}^2 - 1$. It can be observed from FIG. 7 that identical implementation logic can be used for detection of any spatial data stream because of the appropriate permutation of channel matrix.

Figure 8:
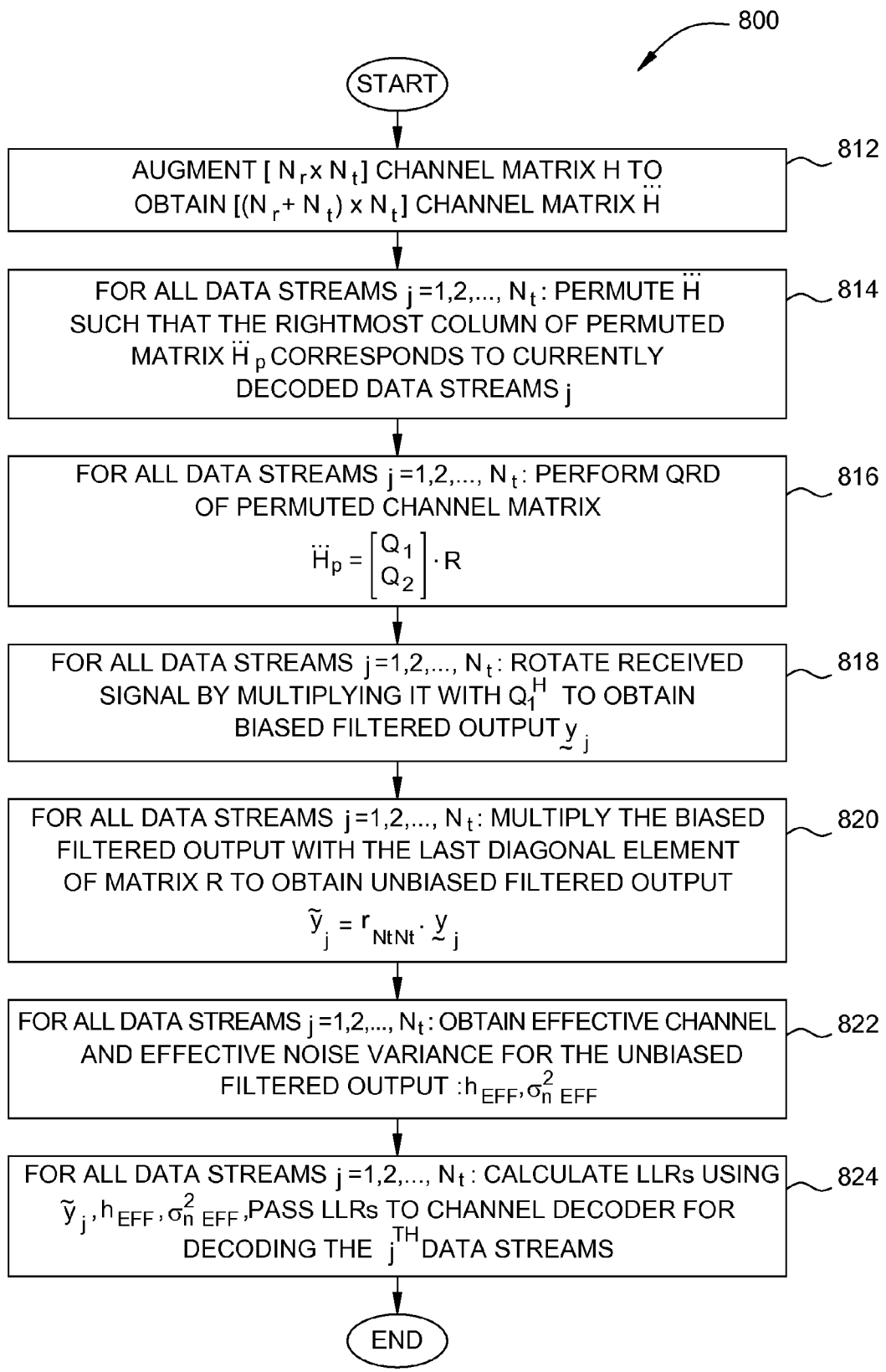
FIG. 8 shows a process of QRMMSE detection with a bias removal applied in a MIMO-OFDM system.

The process of decoding spatial data streams using the QRMMSE detection can be generalized for a system with $N_t$ transmit antennas (spatial subchannels) as shown by flow diagram in FIG. 8. The $[N_r \times N_t]$ channel matrix H is first augmented as in equation (40) and $[(N_r+N_t) \times N_t]$ channel matrix $\ddot{H}$ is obtained, at 812. Following that, the augmented channel matrix $\ddot{H}$ can be permuted, at 814, for every spatial data streams $j=1, 2, \ldots, N_t$ such that the rightmost column of permuted matrix $\ddot{H}_p$ corresponds to the $j^{th}$ decoded stream:

$$\ddot{H}_p = [\ddot{h}_{p(1)}\ \ddot{h}_{p(2)}\ \ldots\ \ddot{h}_{p(N_t-1)}\ \ddot{h}_{p(N_t)=j}] \quad (55)$$

The QR decomposition of a permuted and augmented channel matrix defined by equation (55) may then be conducted for every spatial data stream $j=1, 2, \ldots, N_t$, such that $$\ddot{H}_P = \begin{bmatrix} Q_1 \\ Q_2 \end{bmatrix}.$$

R, at 816. After that, for every spatial data stream $j=1, 2, \ldots, N_t$, the received signal vector y can be rotated by multiplying it with a corresponding Hermitian version of unitary matrix $Q_1$ (matrix $Q_1^H$), which is an upper half of unitary matrix obtained from the QR decomposition of permuted and augmented matrix $\ddot{H}_P$. As a result of this rotation, the biased filtered output may be obtained for every spatial data stream according to equation (44), at 818.

For every spatial data stream $j=1, 2, \ldots, N_t$, the last element of the biased filtered output may be multiplied with the last diagonal element $r_{N_tN_t}$ of upper triangular matrix R to obtain the unbiased filtered output $\tilde{y}_j$ for the $j^{th}$ data stream, at 820. Following this, for every spatial data stream $j=1, 2, \ldots, N_t$, the effective channel and the effective noise variance can be obtained, at 822, as:

$$h_{\mathit{eff}} = r_{N_tN_t}^2 - \sigma_n^2 \text{ and } \sigma_{n_{\mathit{eff}}}^2 = \sigma_n^2 h_{\mathit{eff}}. \quad (56)$$

The unbiased filtered output for the $j^{th}$ spatial data stream can be therefore represented as:

$$\tilde{y}_j = h_{\mathit{eff}} x_j + n_{\mathit{eff}} \quad (57)$$

The resulting signal model for the $j^{th}$ spatial subchannel now becomes:

$$\tilde{y}_j = h_{\mathit{eff}} x_j + \sqrt{h_{\mathit{eff}}}\, n_j,\ n_j \sim N(0,\sigma_n^2), j=1,\ldots,N_t \quad (58)$$

According to this signal model, LLRs of coded bits for each spatial data stream $j=1, 2, \ldots, N_t$ can be calculated by using $\tilde{y}_j$, $h_{\mathit{eff}}$ and $\sigma_{n_{\mathit{eff}}}^2$ at 824. Computed LLRs may be passed to the outer channel decoder for estimation of all $N_t$ spatial data streams.

As presented herein, one feature of the proposed unbiased QRMMSE equalization is a simple bias removal technique. This approach is less complex than the conventional bias removal algorithm based on a division operation, and a substantial improvement of error rate performance may be achieved.

Exemplary QRMMSE Solution With Reduced Complexity

It is shown above that the QR factorization of the augmented channel matrix performs the MMSE equalization of the original channel matrix, as well as that the bias introduced in the MMSE detection can be removed by utilizing the last diagonal element $r_{N_tN_t}$ of the upper triangular matrix R. Also, the MMSE solution only requires the last column of the sub-matrix $Q_1$ from equation (40) and the last element of matrix R.

Therefore, a compact and computationally efficient form of the QRMMSE detection may be derived and utilized as a part of unified hybrid receiver, which also employs the ML detection with preprocessing based on QR decomposition. While the system may be applied to any combination of receive and transmit antennas, to facilitate understanding, a simplified example of a compact form of the QRMMSE detection will be described with reference to a wireless system with two transmit and two receive antennas. As an illustrative example, the decoding of the second spatial data stream can be considered. The identical approach can be applied for decoding of the first spatial data stream, while only difference is that a reversed permutation matrix $\ddot{H}_P = [\ddot{h}_2\ \ddot{h}_1]$ may be employed. The non-augmented channel matrix H and the original received signal y may also be pre-whitened, i.e. variance of the effective noise may be unitary.

Equation (40) shown above may be rewritten as follows:

$$\ddot{H} = \begin{bmatrix} H \\ \sigma_n I_{N_t} \end{bmatrix} = \ddot{Q} R = \begin{bmatrix} Q_1 \\ Q_2 \end{bmatrix} R = \begin{bmatrix} Q_1 R \\ Q_2 R \end{bmatrix} \quad (59)$$

The original channel matrix H and the augmented channel matrix $\ddot{H}$ may be represented as:

$$H = (h_1 h_2) = \begin{pmatrix} h_{11} & h_{12} \\ h_{21} & h_{22} \end{pmatrix} \quad (60)$$

$$\ddot{H} = (\ddot{h}_1 \ddot{h}_2) = \begin{pmatrix} h_{11} & h_{12} \\ h_{21} & h_{22} \\ 1 & 0 \\ 0 & 1 \end{pmatrix} \quad (61)$$

By applying the QR decomposition, the following matrices can be obtained:

$$\ddot{Q} = (\ddot{q}_1 \ddot{q}_2) = \begin{pmatrix} q_{11} & q_{12} \\ q_{21} & q_{22} \\ q_{31} & q_{32} \\ q_{41} & q_{42} \end{pmatrix} = \begin{pmatrix} Q_1 \\ Q_2 \end{pmatrix} = \begin{pmatrix} q_{1s} q_{2s} \\ q_{3s} q_{4s} \end{pmatrix} \quad (62)$$

$$R = (r_1 r_2) = \begin{pmatrix} r_{11} & r_{12} \\ 0 & r_{22} \end{pmatrix} \quad (63)$$

Elements of Q and R matrices may be represented as:

$$\ddot{q}_1 = \ddot{h}_1 \frac{1}{\|r_{11}\|} = \ddot{h}_1 \frac{1}{\|\ddot{h}_1\|}$$

-continued $$\ddot{q}_2 = \left(\ddot{h}_2 - (\ddot{h}_1^H \ddot{h}_2)\ddot{h}_1 \frac{1}{\|\ddot{h}_1\|^2}\right)\frac{1}{r_{22}} \quad (65)$$

$$r_{11} = \|\ddot{h}_1\| \quad (66)$$

$$r_{12} = \ddot{h}_1^H \ddot{h}_2 \frac{1}{\|\ddot{h}_1\|} \quad (67)$$

$$r_{22} = \left\|\ddot{h}_2 - (\ddot{h}_1^H \ddot{h}_2)\ddot{h}_1 \frac{1}{\|\ddot{h}_1\|^2}\right\| = \sqrt{|\ddot{h}_2|^2 - |\ddot{h}_1^H \ddot{h}_2|^2 \frac{1}{|\ddot{h}_1|^2}} \quad (68)$$

The last column of the sub-matrix $Q_1$ from equation (40) may be represented with vector $q_{2s}$ in equation (62). Only this vector and the last diagonal element $r_{22}$ of matrix R may be required for the QRMMSE detection of the second spatial data stream, and can be re-formularized in terms of original channel elements:

$$q_{2s} = \left(h_2 - (h_1^H h_2)h_1 \frac{1}{(1+|h_1|^2)}\right)\frac{1}{r_{22}} \quad (69)$$

$$r_{22} = \sqrt{(1+|h_2|^2) - |h_1^H h_2|^2 \frac{1}{(1+|h_1|^2)}} \quad (70)$$

After applying $q_{2s}$ and $r_{22}$, the unbiased QRMMSE filtered output for the second spatial data stream may be calculated as:

$$\tilde{y}_2 = r_{22} y_2 = r_{22}(q_{2s}^H y) = h_{\mathit{eff}} x + n_{\mathit{eff}} \quad (71)$$

where $h_{\mathit{eff}} = r_{22}^2 - 1$, and $\sigma_{n_{\mathit{eff}}}^2 = 1 \cdot h_{\mathit{eff}}$. Equivalently, after multiplying with element $r_{22}$ of matrix R inside the QR decomposition, the unbiased filtered output for the $2^{nd}$ spatial data stream is equal to:

$$\tilde{y}_2 = g_{2s}^H y = \tilde{s}_2 x_2 + \sqrt{\tilde{s}_2}\, n_2 \quad (72)$$

where $$g_{2s} = r_{22} \cdot q_{2s} \quad (73)$$
$$= \left(h_2 - (h_1^H h_2)h_1 \frac{1}{(1+|h_1|^2)}\right)$$

$$\tilde{s}_2 = h_{\mathit{eff}} = r_{22}^2 - 1 \quad (74)$$
$$= \left((1+|h_2|^2) - |h_1^H h_2|^2 \frac{1}{(1+|h_1|^2)}\right) - 1$$
$$= \left(|h_2|^2 - |h_1^H h_2|^2 \frac{1}{(1+|h_1|^2)}\right)$$

The MMSE detection of the spatial data stream $j=1, 2$ using the QR decomposition of augmented channel matrix may now be summarized as:

$$\tilde{y}_j = g_j^H y = \tilde{s}_j x_j + \sqrt{\tilde{s}_j}\, n_j,\, j=1,2 \quad (75)$$

$$g_1 = \left(h_1 - (h_2^H h_1)h_2 \frac{1}{(1+|h_2|^2)}\right), \quad (76)$$

$$g_2 = \left(h_2 - (h_1^H h_2)h_1 \frac{1}{(1+|h_1|^2)}\right)$$

$$\tilde{s}_1 = \left(|h_1|^2 - |h_2^H h_1|^2 \frac{1}{(1+|h_2|^2)}\right) \quad (77)$$

$$\tilde{s}_2 = \left(|h_2|^2 - |h_1^H h_2|^2 \frac{1}{(1+|h_1|^2)}\right)$$

After comparing equations (76) and (77) with original MMSE solution from equations (13), (15) and (17), it can be observed that these two set of results are identical.

Exemplary Maximum-Likelihood Detection

Maximum likelihood (ML) detection utilizes maximum a posteriori (MAP) or equivalent Log-MAP algorithm to find the most likely transmitted modulation symbols. The ML detection achieves optimal accuracy because it evaluates all modulation symbols that can be potentially transmitted. The Log-MAP detector uses log likelihood ratios (LLRs) of coded bits to decide whether a bit "0" or a bit "1" is communicated over a wireless channel.

In order to reduce computational complexity of the Log-MAP approach, the Max-Log-MAP algorithm may be utilized. If $b_k$ is the $k^{th}$ bit of the transmitted symbol vector x and if the Gaussian probability density function is assumed for transmitted signal x, then the bit LLR L ($b_k$) can be represented as following:

$$L(b_k) = LLR(b_k \mid y) \quad (78)$$
$$= \log\left[\frac{\sum_{x:b_k=0} p(y \mid x)}{\sum_{x:b_k=1} p(y \mid x)}\right]$$
$$\approx \log\left[\frac{\max_{x:b_k=0} p(y \mid x)}{\max_{x:b_k=1} p(y \mid x)}\right]$$
$$= \log\left[\frac{\max_{x:b_k=0} \exp(-d(x))}{\max_{x:b_k=1} \exp(-d(x))}\right]$$
$$= \min_{x:b_k=1} d(x) - \min_{x:b_k=0} d(x)$$

$$d(x) = (x_1, \ldots x_j \ldots, x_{N_t}) \quad (79)$$
$$= \frac{\|y - Hx\|^2}{\sigma_n^2}$$

where expression "x:$b_k=0$" denotes a set of candidate transmission bits x with the $k^{th}$ information bit equal to "0", expression "x:$b_k=1$" denotes a set of candidate transmission bits x with the $k^{th}$ information bit equal to "1", p(x) is a probability density function of candidate vector x, P(x) is a probability of x, and it is assumed that x is equally distributed.

Exemplary Maximum-Likelihood Dection Based on QR Decomposition

The Max-Log-MAP maximum-likelihood detection may also be efficiently implemented with the pre-processing based on QR decomposition (hereinafter abbreviated as QRML detection). By applying the pre-processing with QR decomposition, the computational complexity of Max-Log-MAP based ML detection can be reduced, while preserving detection accuracy.

In the QRML detection, instead of all $N_t$ spatial data streams, ($N_t-1$) streams may be hypothesized. A remaining spatial data stream can be deterministic, and it is generated by rotating received symbols with a unitary matrix obtained after the QR decomposition of the appropriately permuted channel matrix. Filtered symbols may then be sliced to obtain estimated modulation symbols for that particular spatial data stream. This process of hypothesizing ($N_t-1$) spatial data streams and filtering a remaining stream can be performed for every spatial data stream that is utilized in a communication system. Because not all spatial streams are hypothesized, computational complexity of the candidate search process is reduced compare to conventional maximum-likelihood detection.

The QRML detection algorithm represents an optimal solution referencing the Max-Log-MAP algorithm, and it provides the identical error rate performance as the conventional Max-Log-MAP algorithm. Computational complexity is reduced from $O(M^{N_t})$ to $O(N_t M^{N_t-1})$, where M is the constellation size of modulation applied at the transmitter.

Figure 9:
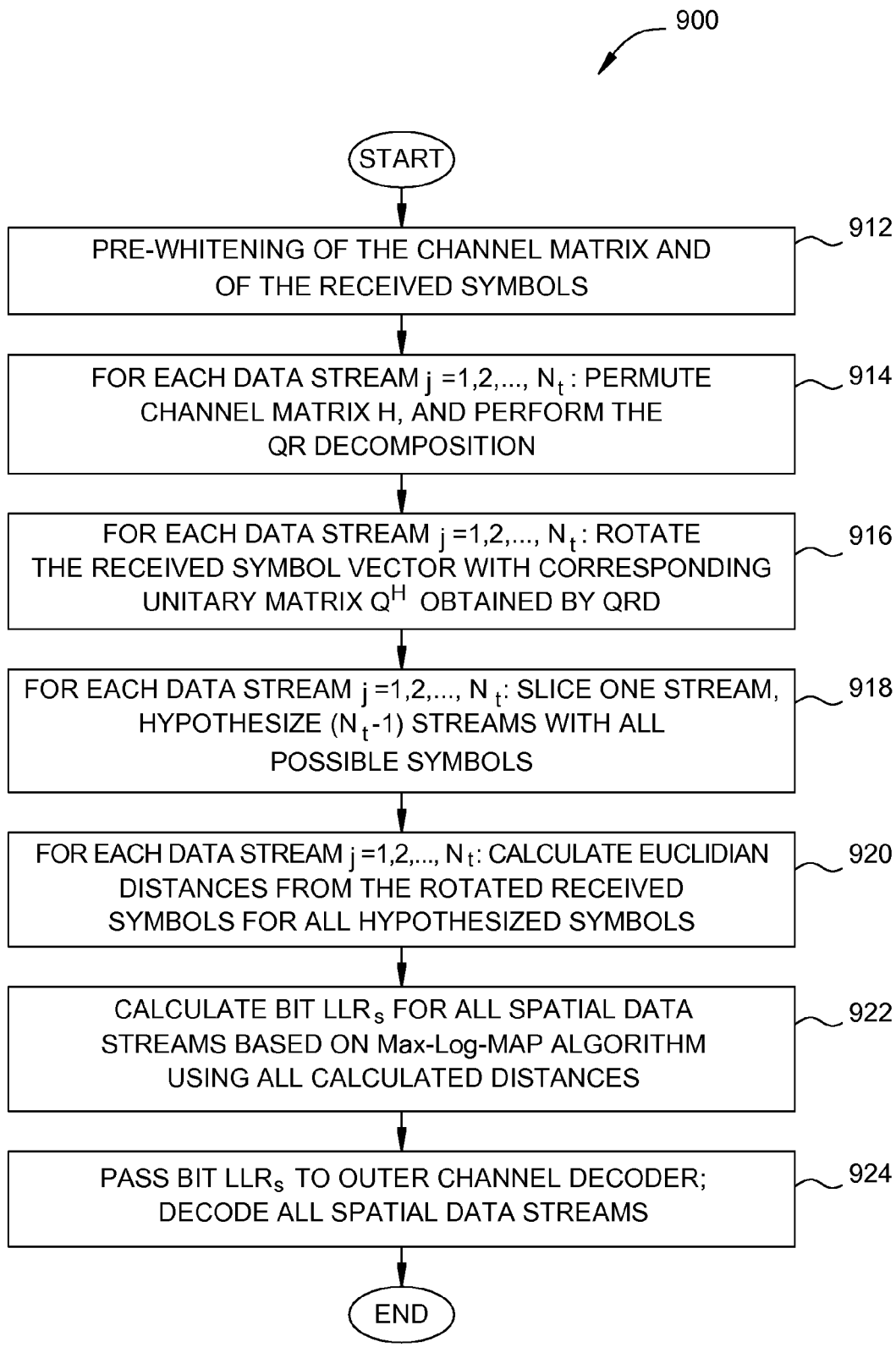
FIG. 9 shows a process of QRMLD detection applied in a MIMO-OFDM system.

FIG. 9 illustrates example operations 900 for performing the QRML detection algorithm in a general communication system with $N_t$ transmit antennas or, equivalently, with $N_t$ spatial subchannels if the spatial multiplexing is utilized at the transmitter. Block-diagram of the QRML receiver applied in an exemplary MIMO-OFDM system with two transmit antennas that performs the process from FIG. 9 is illustrated in FIG. 10.

Figure 10:
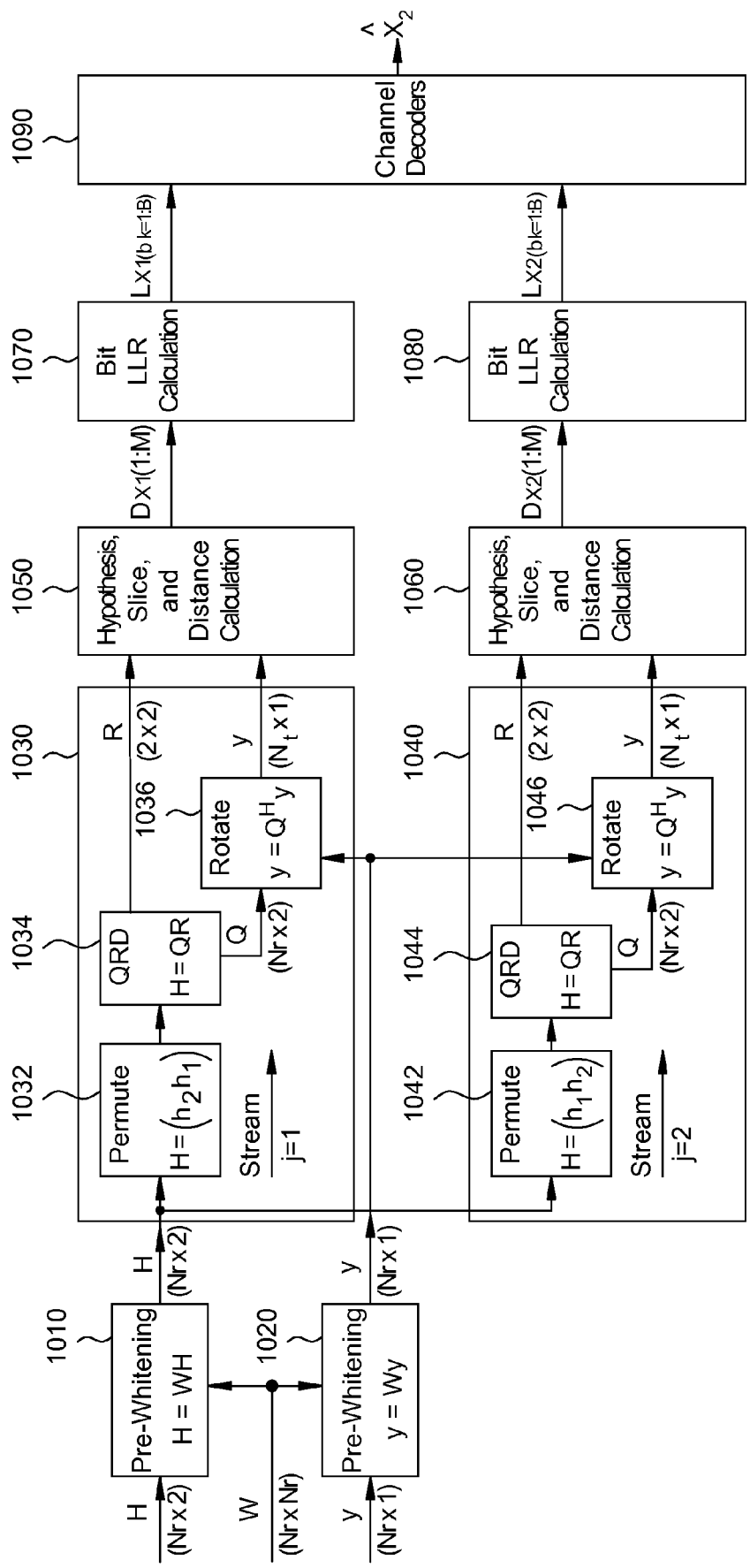
FIG. 10 illustrates an example block diagram of QRMLD based decoder applied in a MIMO-OFDM system with two transmit antennas.

At 912, the pre-whitening of the channel matrix and received symbols may be initially applied, which is also illustrated with units 1010 and 1020 in FIG. 10. Following that, an estimation of every spatial data stream j=1, . . . , $N_t$ can be performed (units 1030 and 1040 in FIG. 10 for the first and second spatial data stream, respectively).

At 914, the pre-whitened channel matrix may be permuted for each spatial data stream j according to equation (55), and then QR decomposition for every spatial data stream may be performed. The permutation and QR decomposition are represented with units 1032 and 1034 in FIG. 10 for estimating the first spatial data stream, and with units 1042 and 1044 in FIG. 10 for estimating the second spatial data stream.

At 916, following the QR decomposition for every utilized spatial data stream, the received symbol vector may be rotated by applying the appropriate unitary matrix $Q^H$ for the particular spatial data stream. Unitary matrix may be obtained as a result of the QR decomposition of the permuted channel matrix that corresponds to that particular spatial subchannel. Rotation of the received signal vector is illustrated with units 1036 and 1046 in FIG. 10 for estimation of the first and second spatial data stream, respectively. It is also well known in the art that rotation with unitary matrix $Q^H$ is equivalent to the zero-forcing (ZF) equalization.

The symbol vector which is a result of rotation (ZF equalization) for every spatial data stream may be utilized for computation of log-likelihood ratios (LLRs) of coded bits transmitted over that particular spatial subchannel. The element of the rotated symbol vector that corresponds to a spatial data stream j may be sliced to obtain the estimated modulation symbol.

At 918, remaining $N_t-1$ spatial data streams may be hypothesized with all possible transmission candidates. This procedure can be performed for every spatial data stream j=1, 2, . . . , $N_t$ in the system.

At 920, Euclidian distances between every hypothesized symbol vector and the rotated received symbol vector may be calculated by applying equation (79). Slicing of the rotated received symbols for particular spatial data stream, hypothesizing of symbol candidates for remaining spatial streams and calculation of Euclidian distances are represented with units 1050 and 1060 in FIG. 10 for decoding of the first and second spatial data stream, respectively.

Ay 922, once the Euclidian distances for all hypothesized symbol candidates are computed, LLRs of coded bits for every spatial data stream may be obtained based on Max-Log-MAP solution given by equation (78). Calculation of bit LLRs that correspond to the first and second spatial data stream may be performed in units 1070 and 1080 in FIG. 10, respectively.

At 924, computed LLRs may then be passed to the outer channel decoder to decode transmitted information data for all utilized spatial subchannels, as illustrated with unit 1090 in FIG. 10.

Exemplary Hybrid MIMO Decoder

A unified hybrid MIMO decoder, as proposed herein, can efficiently support both QRML and QRMMSE detection algorithms. A receiver incorporating a unified hybrid MIMO decoder is illustrated in FIG. 11.

The QRML detection typically achieves better error rate performance than the QRMMSE detection in most conditions, for example, when channel coding rates are high. However, under certain other conditions, the QRMMSE solution may be an attractive solution, not only because of potentially smaller computational complexity and power consumption. For example, the QRMMSE detection may be advantageous compare to QRML detection if user equipment is around the cell edge performing the handover when the information about modulation type of the other cell is not known to the mobile user. Information about the modulation type is required to perform the maximum-likelihood candidate search, while it is not necessary for the QRMMSE detection. Furthermore, if space-time diversity is utilized at the transmitter, then QRMMSE and QRML detection algorithms provide very similar error rate performance, while the computational complexity and power consumption of the QRMMSE detection may be substantially lower than for the QRML solution.

Figure 11:
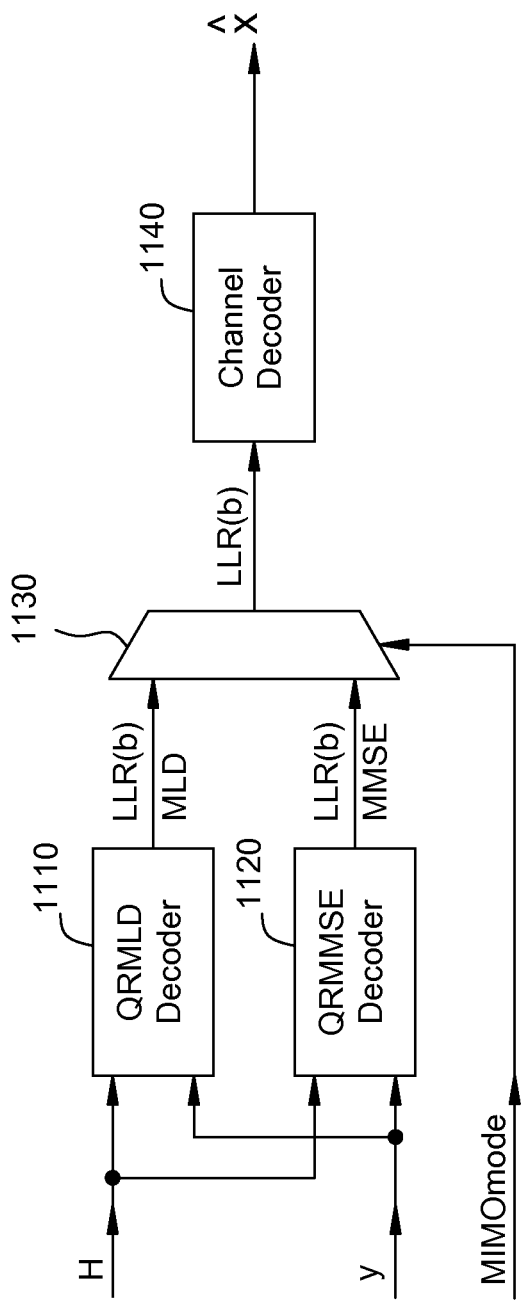
FIG. 11 illustrates a block diagram of a hybrid receiver using two independent MIMO decoders.

As shown in FIG. 11, the receiver may include two processing units that perform QRML detection (unit 1110) and QRMMSE detection (unit 1120). The units may take as an input the pre-whitened matrix of channel estimates for one frequency bin and the pre-whitened received symbol vector, and generate separate sets of LLRs of transmitted coded bits according to both MLD and MMSE algorithms, as previously explained.

Multiplexer 1130 may be used to select one set of LLRs, based on the desired mode of operation (e.g., MLD or MMSE mode) represented with the signal "MIMO mode" illustrated in FIG. 11. The selected set of LLRs (MLD or MMSE) may be then passed to an outer channel decoder 1140 for decoding of information bits transmitted over a plurality of spatial subchannels. It can be observed that the computational complexity of this approach is approximately equal to the cumulative computational complexity of QRML and QRMMSE detection algorithms.

Figure 12:
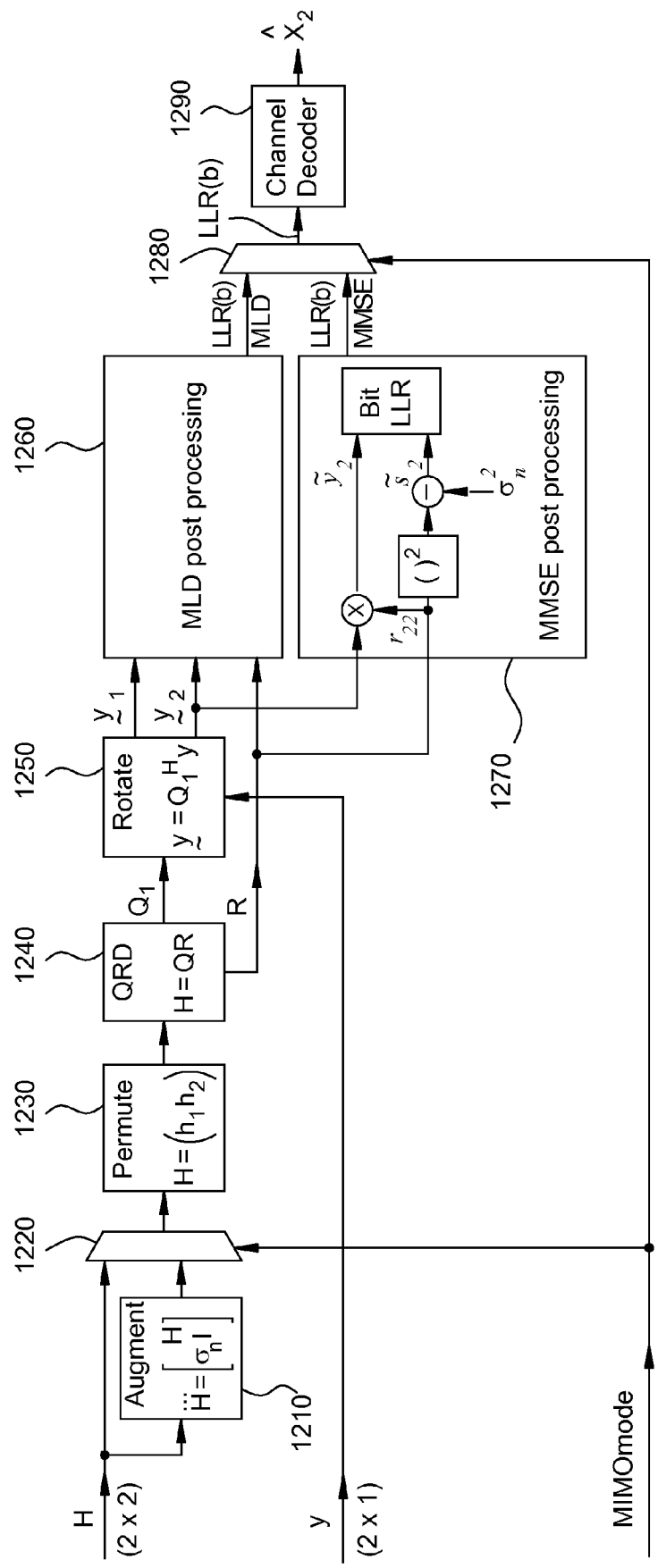
FIG. 12 illustrates a block diagram of a semi-unified hybrid MIMO receiver.

An example block diagram of a "semi-unified" hybrid decoder applied in a MIMO-OFDM system with two transmit antennas (two spatial subchannels) is illustrated in FIG. 12. As an illustrative example, detection of the second spatial data stream is considered in FIG. 12.

As illustrated with unit 1240, the semi-unified decoder architecture may utilize a common QR decomposition unit for detection of one data stream for both QRML and QRMMSE algorithms. Before the QR decomposition, the channel matrix may be augmented (unit 1210) and the appropriate mode of operation (QRMMSE or QRML detection) may be selected by the multiplexer unit 1220. A chosen matrix of channel estimates may then be appropriately permuted by unit 1230 before performing the aforementioned QR decomposition.

In order to perform rotation of the received symbol vector, the QRML detection may utilize the entire matrix $Q_1$ derived in equation (40), which represents the upper half of unitary matrix Q obtained from the QR decomposition of the augmented channel matrix. Furthermore, all elements of the upper triangular matrix R may be employed. The QRMMSE solution for detection of a particular spatial data stream may only utilize the second column $q_2$, of matrix $Q_1$ from equation (62) and the last diagonal element of upper triangular matrix R. The rotation operation (ZF equalization) is illustrated in FIG. 12 with unit 1250.

Filtered outputs $y_1$ and $y_2$ for both spatial data streams may be utilized by the MLD post processing unit 1260 for computation of bit LLRs for the second spatial data stream according to equation (78) and equation (79). On the other side, only the filtered output that corresponds to the second spatial data stream $y_2$ may be utilized by the MMSE post processing unit 1270 for a bias removal and calculation of bit LLRs for that particular spatial subchannel.

The multiplexer 1280 may then select the appropriate set of LLRs based on a desired mode of operation. The outer channel decoder 1290 may utilize a selected set of LLRs (MLD or MMSE) to generate decoded information for the second spatial data stream. The similar procedure can be applied for detection/decoding of the first spatial data stream.

The MMSE post processing may be composed of the previously presented bias removal technique, and the LLR calculation based on equations (78) and (79) according to the effective system model defined by equation (71). Computational complexity of the MMSE post processing may be approximately equal to 6 real multiplications per spatial data stream, and corresponds to the bias removal followed by the LLR calculation. This represents a relatively small increase in overhead in the computational complexity of a semi-hybrid MIMO receiver compared to the receiver that only supports the QRML detection.

In any case, the semi-unified hybrid decoder may be further simplified by utilizing more compact architecture. The resulting scheme is a fully unified hybrid decoder that can support both QRML and QRMMSE detection algorithms with even smaller computational complexity overhead required for implementing the QRMMSE detection.

Figure 13:
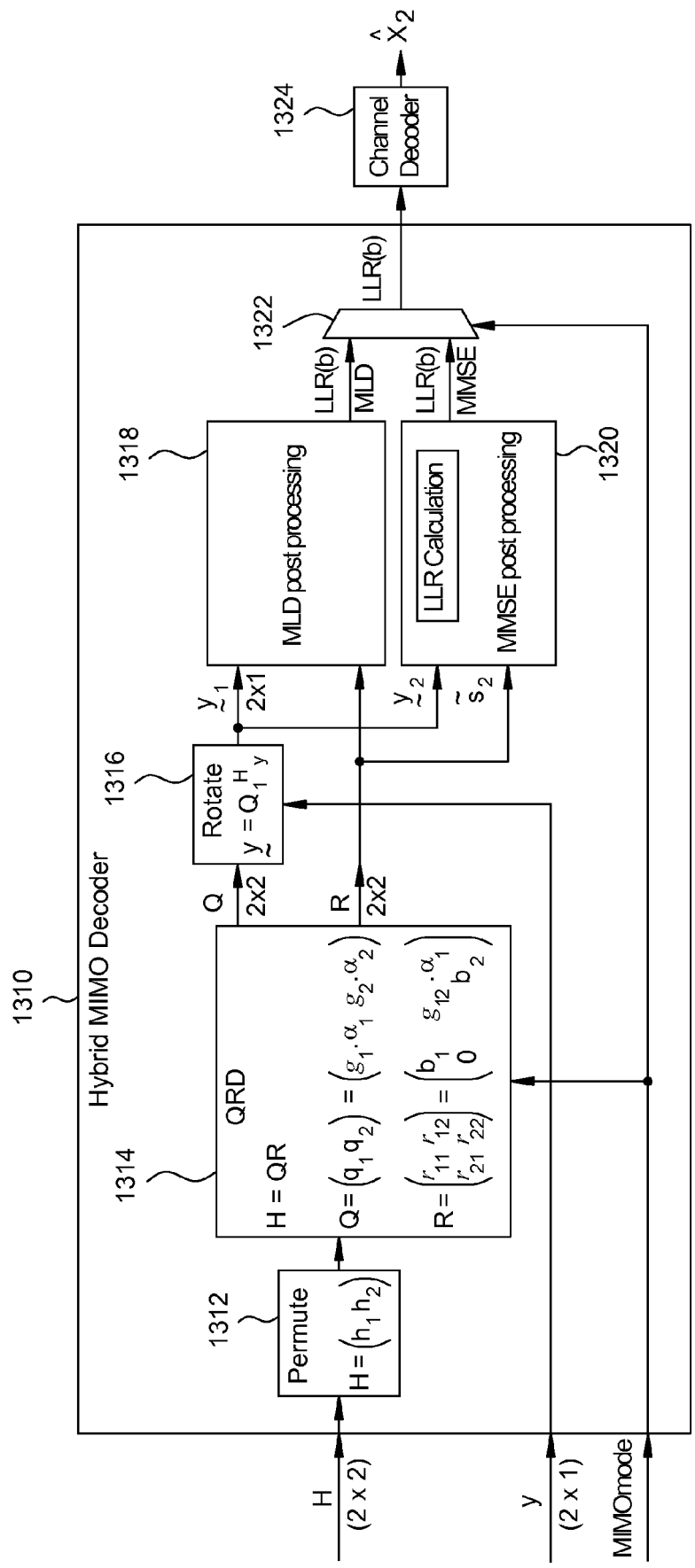
FIG. 13 illustrates a block diagram of a fully unified hybrid MIMO receiver.

The QRML and QRMMSE detection algorithms share several common elements that can be utilized in both cases. For simplicity of analysis, it is assumed an exemplary wireless MIMO-OFDM system with two transmit antennas, and it is considered detection of the second spatial data stream. The block diagram of a fully unified hybrid MIMO receiver that detects the second spatial data stream is illustrated in FIG. 13.

From equations (32) and (35) the following expressions hold in the case of QRML detection:

$$q_2 = \left( h_2 - (h_1^H h_2) h_1 \frac{1}{|h_1|^2} \right) \frac{1}{r_{22}} \quad (80)$$

$$r_{22} = \sqrt{s_2}$$

$$\text{where } s_2 = \left( |h_2|^2 - |h_1^H h_2|^2 \frac{1}{|h_1|^2} \right) \quad (81)$$

From equations (75), (76) and (77) the following expressions are true for the vector of unbiased QRMMSE filter coefficients and the effective channel corresponding to the second spatial data stream:

$$g_2 = \left( h_2 - (h_1^H h_2) h_1 \frac{1}{(1+|h_1|^2)} \right) \quad (82)$$

$$h_{eff} = \tilde{s}_2 = \left( |h_2|^2 - |h_1^H h_2|^2 \frac{1}{(1+|h_1|^2)} \right) \quad (83)$$

After comparing a pair of equations (80)-(81) with a par of equations (82)-(83) it can be noticed that only difference is the normalization factor $1/r_{22}$, the square root factor $r_{22} = \sqrt{s_2}$, and the factor $(1+|h_1|^2)$ in $r_{22}$. Therefore, elements of unitary matrix from equation (62) and upper triangular matrix from equation (63) obtained after the QR decomposition can be represented as follows:

$$q_1 = g_1 \cdot \alpha_1, \; q_2 = g_2 \cdot \alpha_2 \quad (84)$$

$$r_{11} = \beta_1, \; r_{12} = g_{12} \cdot \alpha_1, \; r_{22} = \beta_2 \quad (85)$$
where $$g_1 = h_1, \; g_2 = \left( h_2 - (h_1^H h_2) h_1 \frac{1}{|h_{m1}|^2} \right), \; g_{12} = h_1^H h_2 \quad (86)$$

$$\alpha_1 = \begin{cases} 1/\beta_1 \\ 1 \end{cases}, \alpha_2 = \begin{cases} 1/\beta_2 & \text{if } MLD \text{ Mode} \\ 1 & \text{if } MMSE \text{ Mode} \end{cases} \quad (87)$$

$$\beta_1 = \begin{cases} \sqrt{s_1} \\ s_1 \end{cases}, \beta_2 = \begin{cases} \sqrt{s_2} & \text{if } MLD \text{ Mode} \\ s_2 & \text{if } MMSE \text{ Mode} \end{cases} \quad (88)$$

$$s_1 = |h_{m1}|^2, \; s_2 = \left( |h_2|^2 - |h_1^H h_2|^2 \frac{1}{|h_{m1}|^2} \right) \quad (89)$$

$$|h_{m1}|^2 = \begin{cases} |h_1|^2 & \text{if } MLD \text{ Mode} \\ 1 + |h_1|^2 & \text{if } MMSE \text{ Mode} \end{cases} \quad (90)$$

A hybrid MIMO decoder illustrated in FIG. 13 with unit 1310 is specified for detection of the second spatial data stream in a wireless system with two transmit antennas. It may be composed of several sub-modules. Following the appropriate permutation of columns of the channel matrix in unit 1312, the QR decomposition may be applied in unit 1314. As shown by equations (84)-(90), the resulting matrices of QR decomposition may be generated by selecting the appropriate elements for QRML and for QRMMSE detection.

Following this, the rotation of the received symbol vector may be performed in unit 1316, which utilizes all elements of matrix Q for the QRML detection, and only the second column of matrix Q in the case of QRMMSE detection. All elements from the upper triangular matrix R may be utilized for the QRML detection algorithm, while the QRMMSE solution only uses the last diagonal element $r_{22}$ of matrix R as it is also illustrated in FIG. 13.

Filtered outputs for both spatial data streams $\tilde{y}$ may be utilized by the MLD post processing unit 1318. The bit LLRs that correspond to the second spatial data stream may be calculated according to equations (78) and (79). The filtered output that corresponds only to the second spatial data stream is utilized by the MMSE post processing unit 1320 for calculation of corresponding bit LLRs. The multiplexer 1322 may select the appropriate set of bit LLRs based on a desired mode of operation. Outer channel decoder 1324 may utilize a selected set of LLRs to provide decoded information for the second spatial data stream $\hat{x}_2$.

Figure 14:
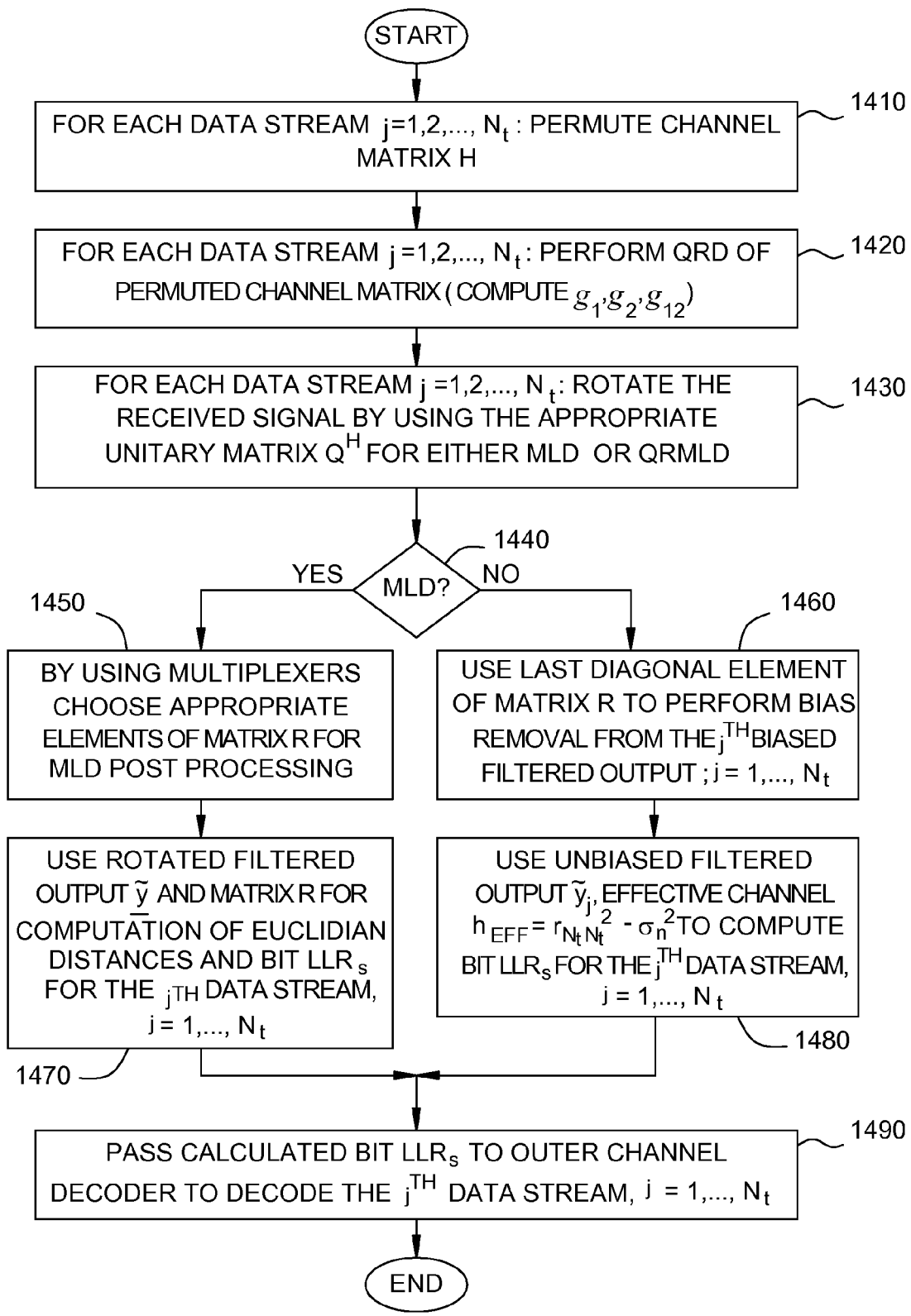
FIG. 14 shows a process of utilizing a fully unified hybrid MIMO receiver composed of QRMMSE and QRML detectors.

FIG. 14 illustrates operations that may be performed for the algorithmic process of a fully unified hybrid receiver in a general case of a wireless system with $N_t$ transmit antennas.

At 1410, for every spatial data stream j=1, . . . , $N_t$ the matrix of channel estimates may be appropriately permuted such that the rightmost column of a resulted permuted matrix corresponds to the $j^{th}$ decoded stream as specified by equation (55). At 1420, for every data stream j=1, . . . , $N_t$, elements of unitary and upper triangular matrices Q and R may be computed: vectors of filter coefficients $g_1$, $g_2$, and scalar $g_{12}$ can be defined by equation (86), and parameters $\alpha_1$, $\alpha_2$, $\beta_1$, $\beta_2$ can be defined by equations (84) and (85).

The appropriate factors may be selected depending if the QRMMSE or QRML detection is utilized. At 1430, according to a selected detection algorithm, the appropriate Q and R matrices may be generated and rotation of the received signal may be performed.

If the QRML detection is selected, as determined at 1440, then all elements of matrix R are generated at 1450, and then utilized for the computation of bit LLRs. Otherwise, if the QRMMSE detection is selected at 1440, only the last diagonal element $r_{22}$ of upper triangular matrix R may be utilized for the purpose of bias removal, at 1460.

In the case of QRML detection, the rotated filtered output $\tilde{y}$ and matrix R may be utilized for computation of Euclidian distances and bit LLRs for each data stream j=1, . . . , $N_t$, at 1470. In the case of QRMMSE detection, for each data stream j=1, . . . , $N_t$, bit LLRs for the $j^{th}$ spatial data stream can be calculated, at 1480, based on following variables: the unbiased filtered output for the $j^{th}$ spatial data stream $\tilde{y}_j$, effective channel that corresponds to the $j^{th}$ spatial data stream $h_{\textit{eff}} = \tilde{s}_j = r_{N_tN_t}^2 - \sigma_n^2$, and variance of the effective noise that corresponds to the $j^{th}$ spatial subchannel $\sigma_{n_{\textit{eff}}}^2 = h_{\textit{eff}} \sigma_n^2$.

At 1490, once the LLRs are calculated for a selected detection scheme, these reliability messages may then be passed to the outer channel decoder for decoding of the $j^{th}$ spatial data stream $\hat{x}_j$.

In the proposed receiver architecture, a significant amount of computational resources can be fully shared between the QRML and QRMMSE detection algorithms. No additional computational complexity overhead is introduced for the QRMMSE detection except the computational complexity required for the LLR calculation. Therefore, a significant reduction in computational complexity may be achieved, when compared to a solution where the separate QRMMSE engine is utilized. In particular, in an exemplary case of two transmit and two receive antennas, the reduction in computational complexity of 15 complex multiplications and 2 real divisions per spatial subchannel may be achieved compare to the receiver architecture with separate detection engines for QRML and QRMMSE detection.

Figure 8A:
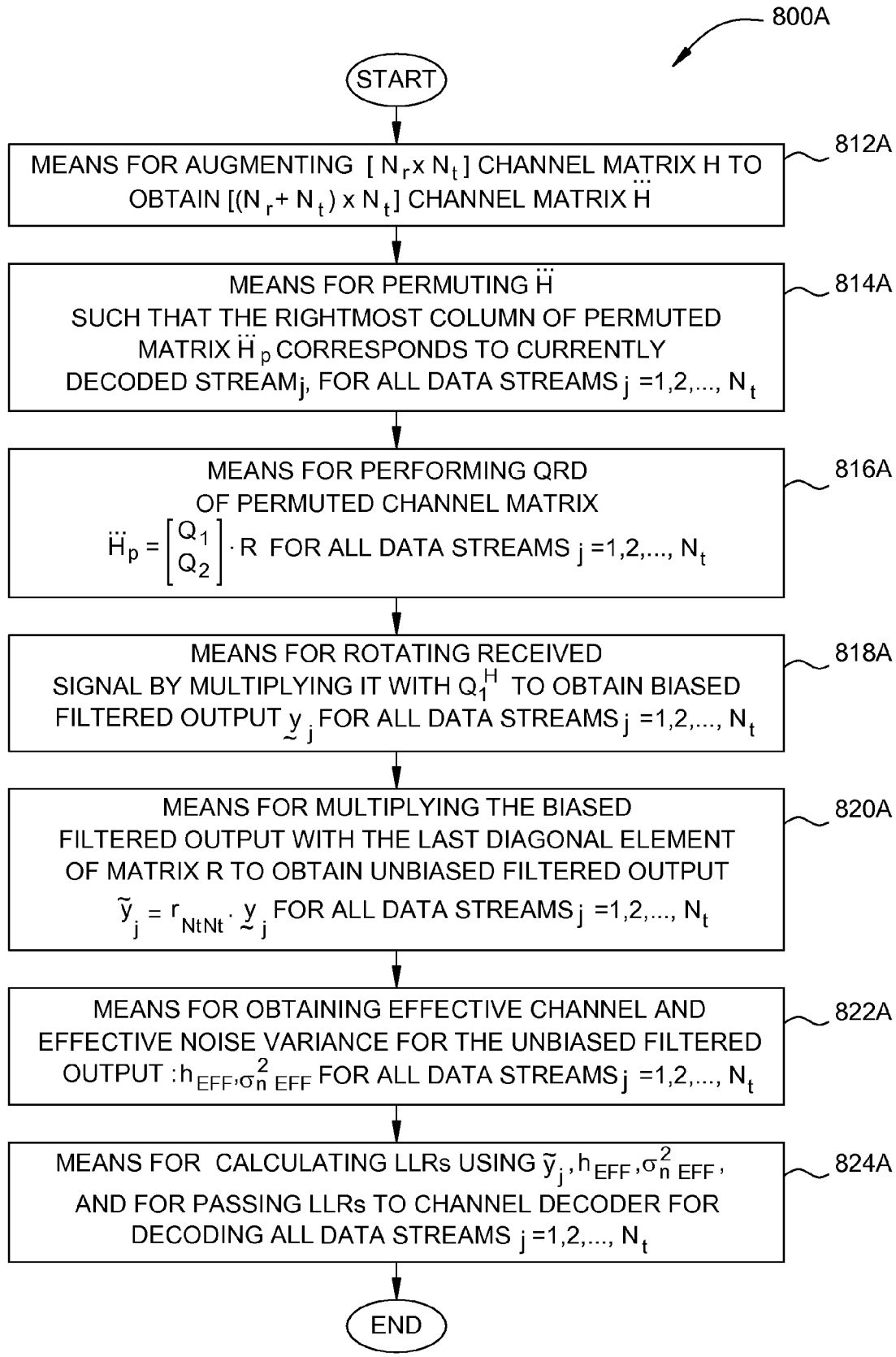
FIG. 8A illustrates example components capable of performing the operations illustrated in FIG. 8.
Figure 9A:
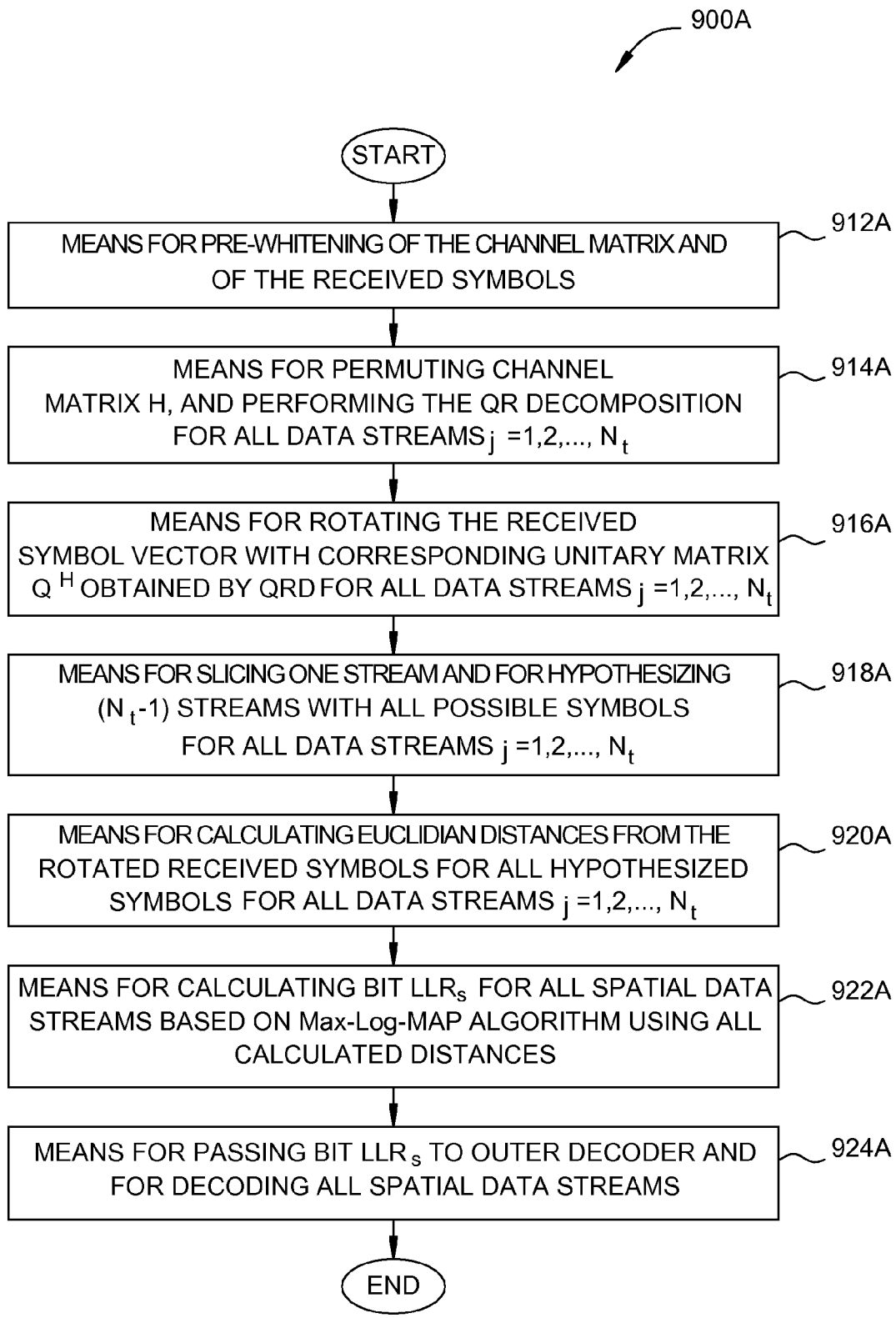
FIG. 9A illustrates example components capable of performing the operations illustrated in FIG. 9.
Figure 14A:
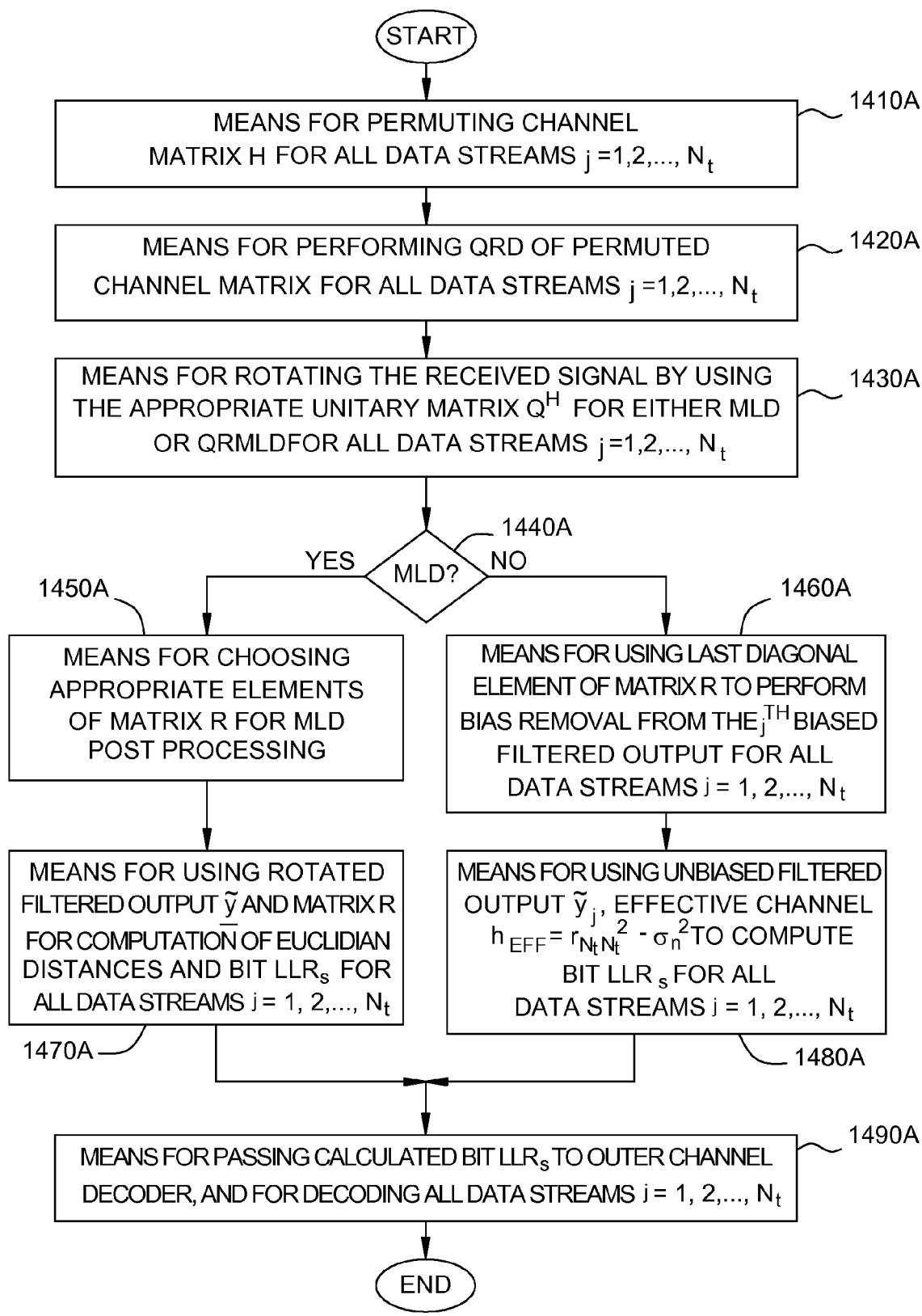
FIG. 14A illustrates example components capable of performing the operations illustrated in FIG. 14.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 812-824 illustrated in FIG. 8 correspond to means-plus-function blocks 812A-824A illustrated in FIG. 8A. Similarly, blocks 912-924 illustrated in FIG. 9 correspond to means-plus-function blocks 912A-924A illustrated in FIG. 9A. Similarly, blocks 1410-1490 illustrated in FIG. 14 correspond to means-plus-function blocks 1410A-1490A illustrated in FIG. 14A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for decoding data transmitted in a multiple-input multiple-output (MIMO) wireless communications system, comprising:
   receiving, on multiple receive antennas, data streams transmitted from multiple transmit antennas;
   generating, a first output with a maximum-likelihood (ML) detection algorithm;
   generating a second output with a minimum mean square error (MMSE) detection algorithm; and
   selecting one of the first output or the second output for decoding the data streams to the exclusion of the other output, wherein selecting one of the first output or the second output comprises setting a mode selection signal to select between a first set of log likelihood ratios (LLRs) for coded bits generated by applying the ML detection algorithm to the data streams and a second set of log likelihood ratios (LLRs) for coded bits generated by applying the MMSE detection algorithm to the data streams.

2. The method of claim 1, wherein selecting one of the first output or the second output for decoding the data streams comprises: selecting between the first and second set of LLRs.

3. The method of claim 2, further comprising: utilizing a first independent MIMO receiver to generate the first set of LLRs based on the ML detection algorithm; and utilizing a second independent MIMO receiver to generate the second set of LLRs based on the MMSE detection algorithm.

4. The method of claim 2, further comprising:
   utilizing a common set of QR components to perform QR decomposition of a permuted channel matrix;
   utilizing a first set of post processing components to generate the first set of LLRs based on the ML detection algorithm; and
   utilizing a second set of post processing components to generate the second set of LLRs based on the MMSE detection algorithm.

5. The method of claim 4, wherein the mode selection signal controls logic to control what elements generated by the QR components are input into the first and second sets of post processing logic.

6. An apparatus for decoding data transmitted in a multiple-input multiple-output (MIMO) wireless communications system, comprising:
   a memory; and
   at least one processor coupled to the memory and configured:
   to receive, on multiple receive antennas, data streams transmitted from multiple transmit antennas;
   to generate a first output with a maximum-likelihood (ML) detection algorithm;
   to generate a second output with a minimum mean square error (MMSE) detection algorithm; and
   to select one of the first output or the second output for decoding the data streams to the exclusion of the other output by setting a mode selection signal to select between a first set of log likelihood ratios (LLRs) for coded bits generated by applying the ML detection algorithm to the data streams and a second set of log likelihood ratios (LLRs) for coded bits generated by applying the MMSE detection algorithm to the data streams.

7. The apparatus of claim 6, in which the at least one processor is further configured to select by: selecting between the first and second set of LLRs.

8. The apparatus of claim 7, in which the at least one processor is further configured: to utilize a first independent MIMO receiver to generate the first set of LLRs based on the ML detection algorithm; and to utilize a second independent MIMO receiver to generate the second set of LLRs based on the MMSE detection algorithm.

9. The apparatus of claim 7, in which the at least one processor is further configured:
   to utilize a common set of QR components to perform QR decomposition of a permuted channel matrix;
   to utilize a first set of post processing components to generate the first set of LLRs based on the ML detection algorithm; and
   to utilize a second set of post processing components to generate the second set of LLRs based on the MMSE detection algorithm.

10. The apparatus of claim 9, wherein the mode selection signal controls logic to control what elements generated by the QR components are input into the first and second sets of post processing logic.

11. An apparatus for decoding data transmitted in a multiple-input multiple-output (MIMO) wireless communications system, comprising:
    means for receiving, on multiple receive antennas, data streams transmitted from multiple transmit antennas;
    means for generating a first output with a maximum-likelihood (ML) detection algorithm;
    means for generating a second output with a minimum mean square error (MMSE) detection algorithm; and
    means for selecting one of the first output or the second output for decoding the data streams to the exclusion of the other output by setting a mode selection signal to select between a first set of log likelihood ratios (LLRs) for coded bits generated by applying the ML detection algorithm to the data streams and a second set of log likelihood ratios (LLRs) for coded bits generated by applying the MMSE detection algorithm to the data streams.

12. The apparatus of claim 11, wherein the means for selecting one of the first output or the second output for decoding the data streams is configured to: select between the first and second set of LLRs.

13. The apparatus of claim 12, further comprising: means for utilizing a first independent MIMO receiver to generate the first set of LLRs based on the ML detection algorithm; and means for utilizing a second independent MIMO receiver to generate the second set of LLRs based on the MMSE detection algorithm.

14. The apparatus of claim 12, further comprising:
    means for utilizing a common set of QR components to perform QR decomposition of a permuted channel matrix; means for utilizing a first set of post processing components to generate the first set of LLRs based on the ML detection algorithm; and means for utilizing a second set of post processing components to generate the second set of LLRs based on the MMSE detection algorithm.

15. The apparatus of claim 14,
wherein the mode selection signal controls logic to control what elements generated by the QR components are input into the first and second sets of post processing logic.

16. A computer-program product for decoding data transmitted in a multiple-input multiple-output (MIMO) wireless communications system, comprising a computer readable medium having non-transitory instructions stored thereon, the instructions being executable by one or more processors and the instructions comprising:
    instructions for receiving, on multiple receive antennas, data streams transmitted from multiple transmit antennas;
    instructions for generating a first output with a maximum-likelihood (ML) detection algorithm;
    instructions for generating a second output with a minimum mean square error (MMSE) detection algorithm; and
    instructions for selecting one of the first output or the second output for decoding the data streams to the exclusion of the other output by setting a mode selection signal to select between a first set of log likelihood ratios (LLRs) for coded bits generated by applying the ML detection algorithm to the data streams and a second set of log likelihood ratios (LLRs) for coded bits generated by applying the MMSE detection algorithm to the data streams.

17. The computer-program product of claim 16, wherein the instructions for selecting one of the first output or the second output for decoding the data streams further comprise: instructions for selecting between the first and second set of LLRs.

18. The computer-program product of claim 17, wherein the instructions further comprise: instructions for utilizing a first independent MIMO receiver to generate the first set of LLRs based on the ML detection algorithm; and
    instructions for utilizing a second independent MIMO receiver to generate the second set of LLRs based on the MMSE detection algorithm.

19. The computer-program product of claim 17, wherein the instructions further comprise:
    instructions for utilizing a common set of QR components to perform QR decomposition of a permuted channel matrix;
    instructions for utilizing a first set of post processing components to generate the first set of LLRs based on the ML detection algorithm; and
    instructions for utilizing a second set of post processing components to generate the second set of LLRs based on the MMSE detection algorithm.

20. The computer-program product of claim 19, wherein the mode selection signal controls logic to control what elements generated by the QR components are input into the first and second sets of post processing logic.

\* \* \* \* \*